US012709479B2

(12) United States Patent
Silbert

(10) Patent No.: US 12,709,479 B2
(45) Date of Patent: Aug. 18, 2026

(54) SYSTEM AND METHOD FOR EFFICIENTLY TRANSFERRING RECEPTACLES OUT OF A RECEPTACLE STORAGE AREA

(71) Applicant: Gen-Probe Incorporated, San Diego, CA (US)

(72) Inventor: Rolf Silbert, Del Mar, CA (US)

(73) Assignees: GEN-PROBE INCORPORATED, San Diego, CA (US); GRIFOLS, S.A., Barcelona (ES)

( * ) Notice: Subject to any disclaimer, the term of this patent is extended or adjusted under 35 U.S.C. 154(b) by 304 days.

(21) Appl. No.: 18/578,632

(22) PCT Filed: Jul. 13, 2022

(86) PCT No.: PCT/US2022/036925
§ 371 (c)(1),
(2) Date: Jan. 12, 2024

(87) PCT Pub. No.: WO2023/287858
PCT Pub. Date: Jan. 19, 2023

(65) Prior Publication Data

US 2024/0327121 A1 Oct. 3, 2024

Related U.S. Application Data

(60) Provisional application No. 63/221,763, filed on Jul. 14, 2021.

(51) Int. Cl.
*G06F 7/00* (2006.01)
*B65G 1/04* (2006.01)
*B65G 1/137* (2006.01)

(52) U.S. Cl.
CPC ......... *B65G 1/1373* (2013.01); *B65G 1/0464* (2013.01); *B65G 2201/0235* (2013.01)

(58) Field of Classification Search
CPC ... B65G 1/00; B65G 1/02; B65G 1/04; B65G 1/137; B65G 1/1371; B65G 1/1373;
(Continued)

(56) References Cited

U.S. PATENT DOCUMENTS 6,321,619 B1 11/2001 Itoh
7,152,504 B2 12/2006 Itoh
(Continued)

FOREIGN PATENT DOCUMENTS

EP 3 473 562 A1 4/2019
WO 2019/014239 A1 1/2019
(Continued)

OTHER PUBLICATIONS

EPO Communication pursuant to Article 94(3) EPC, European Application No. 22753830.3, Oct. 8, 2025.
(Continued)

*Primary Examiner* — Yolanda R Cumbess
(74) *Attorney, Agent, or Firm* — Rothwell, Figg, Ernst & Manbeck, P.C.; Charles B. Cappellari

(57) ABSTRACT

Sample receptacles are automatically transferred from first and second storage areas of a storage module to a conveyor without passing over any other sample receptacle stored in the storage module. Receptacle holding positions in the first and second storage areas are arranged in rows and columns, and sample containers are transferred row-by-row or column-by-column, starting with sample container held closest to a first side of the first or second storage area. Receptacles transferred from the first storage area are transferred across the first side to the conveyor. Receptacles transferred from the second storage area are transferred across the first side into a first receptacle transport path between the first and second storage areas, and then to a second receptacle transport path across the first storage area, and then to the
(Continued)

conveyor. To avoid passing a receptacle over another receptacle, receptacles are first removed from intervening holding positions between a respective holding position from which the receptacle is being transferred and the first side of the first or second storage area.

36 Claims, 8 Drawing Sheets

(58) Field of Classification Search
CPC .......... B65G 1/0464; B65G 2201/0235; B65G 2201/0276; B65G 2201/0261; B65G 47/905; B65G 47/907; G01N 35/0099; G01N 35/02; G01N 35/025; G01N 35/04; G01N 35/021; G01N 35/10; G01N 35/1065
USPC .......................................... 700/213–214, 218
See application file for complete search history.

(56) References Cited

U.S. PATENT DOCUMENTS

| | | | |
|---|---|---|---|
| 8,731,712 B2 | 5/2014 | Hagen et al. | |
| 9,335,336 B2 | 5/2016 | Silbert et al. | |
| 9,732,374 B2 | 8/2017 | Buse et al. | |
| 9,766,258 B2 | 9/2017 | Itoh | |
| 9,776,811 B2 | 10/2017 | Itoh | |
| 2015/0276774 A1 | 10/2015 | Pollack | |
| 2017/0254827 A1 | 9/2017 | Walker et al. | |
| 2019/0250180 A1 | 8/2019 | Pollack et al. | |
| 2020/0256883 A1* | 8/2020 | Sugiyama | G01N 35/0092 |
| 2021/0061584 A1 | 3/2021 | Silbert | |
| 2023/0390947 A1 | 12/2023 | Silbert et al. | |

FOREIGN PATENT DOCUMENTS

| | | |
|---|---|---|
| WO | 2020/226969 A2 | 11/2020 |
| WO | 2021/216929 A1 | 10/2021 |
| WO | 2021/216931 A1 | 10/2021 |
| WO | 2021/216932 A1 | 10/2021 |

OTHER PUBLICATIONS

International Search Report and Written Opinion dated Oct. 24, 2022 in International Application No. PCT/US2022/036925 (9 pages).

International Preliminary Report on Patentability and Written Opinion dated Jan. 16, 2024 in International Application No. PCT/US2022/036925 (7 pages).

* cited by examiner 100
108
184
184a
184b
182a
182b
182c
182d
182e
182g
182h
104
118
119
111
216
218
INPUT STATION
106a
105a
130a
OUTPUT STATION
106b
105b
130b
DE-CAPPING STATION
106c
105c
130c
SAMPLE PREP STATION
106d
105d
130d
ANALYZER STATION
106e
105e1
105e2
130e
CAPPING STATION
106g
105g
130g
STORAGE STATION
106h
105h
130h
CONTROLLER
105
MAIN CONTROLLER
105i
CONVEYOR CONTROLLER
105j 114
103
102
104
116
126
112
110

107
2B
102
139
104
2B
114
109
126
103
112
110

130a
131
131a
131b
132a
132b
133
134
136
140b
135
140a/135
118
119
156
150
155
152
135
146
147
104
144
137

SYSTEM AND METHOD FOR EFFICIENTLY TRANSFERRING RECEPTACLES OUT OF A RECEPTACLE STORAGE AREA

CROSS REFERENCE TO RELATED APPLICATIONS

This application is a 35 U.S.C. § 371 National Stage of International Patent Application No. PCT/US2022/036925, filed Jul. 13, 2022, which claims priority to US Application No. 63/221,763, filed Jul. 14, 2021.

FIELD

This disclosure generally relates to automated analysis systems and methods for analyzing liquid samples, and more particularly, to mechanized, computer-controlled systems and methods for automatically and efficiently transferring receptacles containing liquid samples out of a storage area storing a plurality of receptacles in such a manner as to minimize the size of the storage area and to minimize risk of cross-contamination between different sample receptacles stored in the storage area.

BACKGROUND

Automated analysis systems for handling and analyzing various types of fluid samples (also referred to as fluid specimens) are widely used in clinical diagnosis and medical research. The fluid samples may be any type of sample or specimen type that exists naturally as a liquid or which has been liquified. Fluid samples may include whole blood, blood serum, blood plasma, interstitial fluid, phlegm, urine, fecal matter, semen, mucus, sputum, saliva, tears, pus, and nasopharyngeal or genitourinary specimens. Fluid samples may be obtained from a variety of sources, including animal, food, environmental, and industrial sources. A number of automated analysis systems are commercially available for performing assays on fluid samples to detect and/or quantify the presence or amount of antigens, antibodies, cell abnormalities, disease states, and/or disease-associated pathogens, such as parasites, fungi, bacteria, and viruses that may be present in the samples. For diagnostic assays, antigens or antibodies are targeted in immunoassays and nucleic acids are targeted in molecular assays. There are also automated analysis systems for performing genetic testing on a biological fluid to identify genes present in a sample, for instance, to detect disease-associated mutations.

Automated analysis systems may include a variety of stations, which may include sample preparation, or “prep,” stations and analysis stations for preparing and analyzing samples contained in sample receptacles (e.g., test tubes, vials, or the like), storage stations for holding sample receptacles before and/or after the sample receptacles are transported to and processed within the automated analysis system, and/or transport mechanisms for transporting sample receptacles between stations of the automated analysis system. Transport mechanisms may include robots, conveyors, and other devices for moving the sample receptacles and other materials between the stations. Some stations may include associated sample receptacle handling mechanisms and/or fluid handling mechanisms for manipulating the sample receptacles, samples, reagent vessels and reagents, such as robots (e.g., pick-and-place robots) and fluid-aspirating and fluid-dispensing devices (e.g., robotic pipettors). For example, a receptacle storage station, or station having receptacle storage capacity, may include a robot (e.g., a pick-and-place robot) for transporting sample receptacles between a sample receptacle holding structure (e.g., a receptacle rack) within the station and the transport mechanism(s) located outside the station.

The components and/or stations of the automated analysis system may be controlled by a controller, including one or more computerized controllers, which control the operation of each of the components or stations in order to integrate and coordinate the components involved in performing one or more assays on a plurality of samples contained in sample receptacles.

To maximize storage capacity while minimizing the size of the associated station, sample receptacle holding structures, such as receptacle racks, may be configured so that the sample receptacles are held as closely together as possible, in some cases with a spacing between adjacent sample receptacles that is smaller than the width or diameter of an individual sample receptacle supported by the sample receptacle holding structure. Accordingly, to transport a sample receptacle from a sample receptacle holding structure (e.g., a receptacle rack) within the station to a transport mechanism(s) (e.g., a conveyor) located outside the station, sample receptacles being transported may have to pass over one or more other sample receptacles supported by the receptacle holding structure. Thus, a sample receptacle being transported must be elevated by the robot sufficiently high relative to the surrounding sample receptacles so as not to contact other sample receptacles during transport. This may require that the station have a relatively large vertical dimension. In addition, any material that may fall from a first sample receptacle into a second sample receptacle over which it is being transported may contaminate the contents of the second sample receptacle.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

A receptacle storage module has a first side and a second side. In an embodiment, the second side of the receptacle storage module is an input side at which receptacles are placed into the receptacle storage module, and the first side is an output side at which receptacles are removed from the receptacle storage module and transferred to receptacle holders on a conveyer track. Sample receptacles, such as liquid receptacles, are stored within the receptacle storage module within at least a first storage area adjacent the first side of the module and a second storage area adjacent the second side of the module. Each of the first and second storage areas has opposed first and second sides and opposed third and fourth sides oriented transversely to the first and second sides. The first and second storage areas are arranged with the first side of the second storage area facing the second side of the first storage area.

The first storage area includes a plurality of receptacle holding positions arranged in a series of parallel rows extending from the third side to the fourth side of the first storage area and a series of parallel columns extending from the first side to the second side of the first storage area. The second storage area includes a plurality of receptacle holding positions arranged in a series of parallel rows extending from the third side to the fourth side of the second storage area and a series of parallel columns extending from the first side to the second side of the second storage area. Each receptacle holding position is configured to hold one sample receptacle in an upright orientation with an upper portion of the sample receptacle being exposed to be graspable by a mechanical gripper. Each receptacle holding position of the first storage area may be spatially separated from each adjacent receptacle holding position of the first storage area by a distance that is less than the width of a single receptacle holding position, and each receptacle holding position of the second storage area may be spatially separated from each adjacent receptacle holding position of the second storage area by a distance that is less than the width of a single receptacle holding position, so that it is not possible for a sample receptacle to pass through a gap between adjacent receptacle holding positions. The second side of the first storage area is separated from the first side of the second storage area by a distance at least as wide as the width of the widest receptacle holding position of the second storage area, thereby defining a first receptacle transport path situated between the second side of the first storage area and the first side of the second storage area and through which the widest sample receptacle held in the second storage area can pass without contacting or passing over receptacle holding positions adjacent the first receptacle transport path.

A sample receptacle handling system associated with the receptacle storage module may comprise a mechanized robot that includes a mechanical gripper configured to grip an individual sample receptacle within a receptacle holding position and a gripper mover configured to effect movement of the gripper in a vertical direction and orthogonal horizontal directions. Each receptacle holding position is configured to hold an associated sample receptacle in an orientation enabling the sample receptacle handling system to grasp the receptacle to remove the receptacle from the receptacle holding position or, if the receptacle holding position is empty, to receive a sample receptacle placed into the receptacle holding position by the receptacle transfer apparatus.

A portion of the first or second storage area comprising a contiguous group of receptacle holding positions, which may comprise one or more distinct receptacle racks, is designated as a STAT section for holding STAT sample receptacles.

A portion of the first storage area comprising a contiguous group of receptacle holding positions, not including any receptacle holding positions within the STAT section of the first storage area, and which may comprise one or more distinct receptacle racks, is designated as a quarantine section. The quarantine section may be initially empty, i.e., devoid of sample receptacles.

Sample receptacles are omitted from at least one column of adjacent receptacle holding positions of the first storage area that are at least as wide as the widest receptacle holding position of the second storage area, thereby defining a second receptacle transport path extending from the first side of the first storage area to the second side of the first storage area and intersecting the first receptacle transport path. In one example, the column of empty receptacle holding positions extending from the first side of the first storage area to the second side of the first storage area and defining the second receptacle transport path is within the quarantine section of the first storage area.

The receptacle storage module may include receptacle storage areas in addition to the first receptacle storage area and second receptacle storage area, e.g., a third receptacle storage area, a fourth receptacle storage area, etc. Each receptacle storage area includes a plurality of receptacle holding positions arranged in parallel rows and columns. For each receptacle storage area, a receptacle transport path extending between the third side and the fourth side is provided between each receptacle storage area and the subsequent receptacle storage area, i.e., between the first and second receptacle storage areas, between the second and third receptacle storage areas, between the third and fourth receptacle storage areas, etc. In addition, each receptacle storage area, with the exception of the last receptacle storage area that is furthest from the first side of the receptacle storage module, includes a receptacle storage path extending in a direction from the first side of the receptacle storage area to a second side of the receptacle storage area (i.e., parallel to or encompassing a column of receptacle holding positions of the receptacle storage area).

In one embodiment, each receptacle storage area comprises two or more receptacle racks removably supported within the receptacle storage module on a rack supporting platform, and each rack includes a plurality of receptacle holding positions arranged in rows and columns.

Each rack of the first storage area has opposed first and second sides, corresponding to the first and second sides, respectively, of the first storage area, and opposed third and fourth sides oriented transversely to the first and second sides. Each rack of the second storage area has opposed first and second sides, corresponding to the first and second sides, respectively, of the second storage area, and opposed third and fourth sides oriented transversely to the first and second sides.

The receptacle racks of the first storage area are arranged side-by-side from the third side of the first storage area to the fourth side of the first storage area, i.e., with the fourth side of each receptacle rack facing, abutting, or nearly abutting the third side of each adjacent rack. The receptacle racks of the second storage area are arranged side-by-side from the third side of the second storage area to the fourth side of the first storage area, i.e., with the fourth side of each receptacle rack facing, abutting, or nearly abutting the third side of each adjacent rack.

The STAT section may correspond to one receptacle rack of the first storage area or the second storage area, and the quarantine section may correspond to a different receptacle rack of the first storage area.

A controller controls the sample receptacle handling system to remove sample receptacles from the receptacle storage module by removing sample receptacles, one at a time, from the receptacle holding positions of the first and second storage areas and transporting the receptacle out of the storage module and to receptacle holders on a track of the conveyor adjacent the first side of the storage module. If the receptacle storage module includes a STAT section, the sample receptacle handling system is controlled by the controller to first remove all sample receptacles held in receptacle holding positions within the STAT section of the first or second storage area and then remove sample receptacles held in remaining receptacle holding positions within the first and second storage areas. In one embodiment, the controller is programmed to actuate (instruct, command) the gripper mover of the sample receptacle handling system to position the mechanical gripper at the first receptacle holding position of the STAT section (e.g., first row and first column of the STAT section). The mechanical gripper is then actuated to attempt to grip a sample receptacle at the first receptacle holding position—e.g., by positioning gripper segments of opposed gripper fingers in an open configuration adjacent opposed sides of an upper portion of the sample receptacle projecting above the first receptacle holding position and then closing the opposed gripper fingers to grip the opposed sides of the sample receptacle. If there is no sample receptacle at that receptacle holding position, e.g., as determined if the opposed gripper fingers of the mechanical gripper close to positions in which the gripper segments of the gripper fingers are spaced apart by a distance that is less than the narrowest sample receptacle, the controller then actuates the gripper mover to position the mechanical gripper at the second receptacle holding position of the STAT section (e.g., first row and second column of the STAT section). The mechanical gripper is then actuated to attempt to pick up a sample receptacle at the second receptacle holding position, as described above, and if no sample receptacle is located at the second receptacle holding position, the controller then actuates the gripper mover to position the mechanical gripper at the third receptacle holding position of the STAT section (e.g., first row and third column of the STAT section). This process of attempting to grasp a sample receptacle at successive receptacle holding positions is repeated a prescribed number of times (e.g., 1, 2, 3, 4, 5, 6, 7, 8, 9, 10, or more times), and if no sample receptacles are detected at the prescribed number of consecutive receptacle holding positions, the controller is programmed to actuate the sample receptacle handling system to attempt to pick up sample receptacles at a different receptacle storage area or at a different receptacle rack. On the other hand, if a sample receptacle is gripped by the mechanical gripper, the gripped sample receptacle is removed from the respective receptacle holding position and transferred from the receptacle holding position to the receptacle holder on the conveyor track. After the sample receptacle is successfully transferred to a receptacle holder, the controller then actuates the gripper mover to position the mechanical gripper at the next receptacle holding position (e.g., same row, next column or next row, first column of the STAT section).

The controller is programmed to detect if sample receptacles have been, or may have been, added to the STAT section after the STAT section was previously emptied. For example, if the STAT section comprises a discrete, removable receptacle rack, a switch may be provided to generate a signal that is detectable by the controller when a new rack is placed in the STAT section of the first (or second) storage area. When the controller detects that sample receptacles have been, or may have been, added to the STAT section after the STAT section was previously emptied, the controller is programmed to actuate the sample receptacle handling system to attempt to grip sample receptacles from the STAT section, as described above, to determine if there are sample receptacles in the STAT section.

Sample receptacles are transferred from the first receptacle storage area to receptacle holders on the conveyor track by moving each sample receptacle with the sample receptacle handling system from a respective receptacle holding position of the first receptacle storage area, over the first side of the first receptacle storage area, and to a receptacle holder on the conveyor track, and each of the sample receptacles is removed from the first receptacle storage area in an order and via a pathway over the first side of the first receptacle storage area such that the removed sample receptacle does not pass over another sample receptacle held in a receptacle holding position within the first receptacle storage area. Accordingly, if there are one or more intervening receptacle holding positions between a respective receptacle holding position of the first receptacle storage area and the first side of the first receptacle storage area, the sample receptacle held in the respective receptacle holding position of the first receptacle storage area is not removed until the sample receptacle(s) are removed from each of the intervening receptacle holding positions.

Sample receptacles are transferred from the second receptacle storage area to receptacle holders on the conveyer track by moving each sample receptacle with the sample receptacle handling system from a respective receptacle holding position of the second receptacle storage area, over the first side of the second receptacle storage area, and into the first receptacle transport path. Each of the sample receptacles is removed from the second receptacle storage area in an order and via a pathway over the first side of the second receptacle storage area and into the first receptacle transport path such that the removed sample receptacle does not pass over another sample receptacle held in a receptacle holding position within the second receptacle storage area. Accordingly, if there are one or more intervening receptacle holding positions between a respective receptacle holding position of the second receptacle storage area and the first receptacle transport path, the sample receptacle held in the respective receptacle holding position of the second receptacle storage area is not removed until the sample receptacle(s) are removed from the intervening receptacle holding positions. After the removed sample receptacle is transferred from the respective receptacle holding position of the second receptacle storage area into the first receptacle transport path, the controller is programed to move the sample receptacle with the sample receptacle handling system for a distance necessary to align the removed sample receptacle with the second receptacle transport path. The controller is programmed to then move the removed sample receptacle with the sample receptacle handling system along the second receptacle transport path from the second side of the first receptacle storage area over the first side of the first receptacle storage area and to a receptacle holder on the conveyor track.

Aspects of the disclosure include a system for storing a plurality of sample receptacles and for transferring each sample receptacle out of the system without passing over another sample receptacle stored in the system. The system may include a first receptacle storage area having opposed first and second sides and opposed third and fourth sides oriented transversely to the first and second sides and which includes a plurality of receptacle holding positions. Each receptacle holding position may be configured to hold a single sample receptacle and may be spaced apart from any directly adjacent receptacle holding position by a distance that is less than the width of the narrowest receptacle holding position. The plurality of receptacle holding positions are arranged in a series of parallel rows oriented in a first direction extending from the third side of the first receptacle storage area to the fourth side of the first receptacle storage area and a series of parallel columns oriented in a second direction extending from the first side of the first receptacle storage area to the second side of the first receptacle storage area.

The system may include a second receptacle storage area having opposed first and second sides and opposed third and fourth sides oriented transversely to the first and second sides and which includes a plurality of receptacle holding positions. Each receptacle holding position is configured to hold a single sample receptacle and is spaced apart from any directly adjacent receptacle holding position by a distance that is less than the width of the narrowest receptacle holding position. The plurality of receptacle holding positions are arranged in a series of parallel rows oriented in a first direction extending from the third side of the second receptacle storage area to the fourth side of the second receptacle storage area and a series of parallel columns oriented in a second direction extending from the first side of the second receptacle storage area to the second side of the second receptacle storage area.

The first and second receptacle storage areas are arranged with the first side of the second receptacle storage area facing the second side of the first receptacle storage area, and the second side of the first receptacle storage area is spaced apart from the first side of the second receptacle storage area by a distance of not less than the width of the widest receptacle holding position of the second receptacle storage area, thereby defining a first receptacle transport path between the first and second receptacle storage areas.

The first receptacle storage area includes a second receptacle transport path extending from the first side of the first receptacle storage area to the second side of the first receptacle storage area, and the second receptacle transport path has a width of not less than the width of the widest receptacle holding position of the second receptacle storage area. The system may include a conveyor configured to transport the sample receptacles, a sample receptacle handling system configured to transfer sample receptacles held in the first and second receptacle storage areas from their respective receptacle holding positions to the conveyor, and a controller in communication with the sample receptacle handling system. The controller may be programmed to transfer sample receptacles from the first receptacle storage area to the conveyor by moving each sample receptacle with the sample receptacle handling system from a respective receptacle holding position of the first receptacle storage area, over the first side of the first receptacle storage area, and to the conveyor without passing over another sample receptacle held in a receptacle holding position within the first receptacle storage area. The controller may be programmed to transfer sample receptacles from the second receptacle storage area to the conveyer by moving each sample receptacle with the sample receptacle handling system from a respective receptacle holding position of the second receptacle storage area, over the first side of the second receptacle storage area, and into the first receptacle transport path without passing over another sample receptacle held in a receptacle holding position within the second receptacle storage area. After the removed sample receptacle is transferred from the respective receptacle holding position of the second receptacle storage area into the first receptacle transport path, the controller is programmed to move the sample receptacle with the sample receptacle handling system for a distance necessary to align the removed sample receptacle with the second receptacle transport path and to then move the removed sample receptacle with the sample receptacle handling system along the second receptacle transport path from the second side of the first receptacle storage area over the first side of the first receptacle storage area and to the conveyor.

According to further aspects of the disclosure, the second receptacle transport path may include a column of empty receptacle holding positions of the first receptacle storage area.

According to further aspects of the disclosure, the controller is programmed to move each sample receptacle with the sample receptacle handling system from a respective receptacle holding position of the first receptacle storage area, over the first side of the first receptacle storage area, and to the conveyor without passing over another sample receptacle held in a receptacle holding position within the first receptacle storage area by moving any sample receptacle from a respective receptacle holding position of the first receptacle storage area, other than a receptacle held in a respective receptacle holding position located in the row that is closest to the first side of the first receptacle storage area, over each of one or more intervening receptacle holding positions located between the respective receptacle holding position and the first side of the first receptacle storage area, and the sample receptacles will have been previously removed from the one or more intervening receptacle holding positions.

According to further aspects of the disclosure, the controller is programmed to move each sample receptacle with the sample receptacle handling system from a respective receptacle holding position of the second receptacle storage area, over the first side of the second receptacle storage area, and into the first receptacle transport path without passing over another sample receptacle held in a receptacle holding position within the second receptacle storage area by moving any sample receptacle from a respective receptacle holding position of the second receptacle storage area, other than a receptacle held in a respective receptacle holding position located in the row that is closest to the first side of the second receptacle storage area, over each of one or more intervening receptacle holding positions located between the respective receptacle holding position and the first side of the second receptacle storage area, and sample receptacles will have been previously removed from the one or more intervening receptacle holding positions.

According to further aspects of the disclosure, a pathway over which each sample receptacle is moved with the sample receptacle handling system from the respective receptacle holding position of the first receptacle storage area over the first side of the first receptacle storage area is programmed into the controller for each receptacle holding position of the first receptacle storage area. A pathway over which each sample receptacle is moved with the sample receptacle handling system from the respective receptacle holding position of the second receptacle storage area over the first side of the second receptacle storage area and into the first receptacle transport path is programmed into the controller for each receptacle holding position of the second receptacle storage area.

According to further aspects of the disclosure, the sample receptacle handling system may include a mechanized robot including a mechanical gripper configured to grip an individual sample receptacle within a receptacle holding position and a gripper mover configured to effect movement of the gripper in a vertical direction and orthogonal horizontal directions.

According to further aspects of the disclosure, the controller is programmed to cause the sample receptacle handling system to remove sample receptacles from respective receptacle holding positions by attempting to grip a sample receptacle at the respective receptacle holding position with the mechanical gripper and to detect whether or not a sample receptacle is held at the respective receptacle holding position, and, if no sample receptacle is detected at the respective receptacle holding position, to advance the mechanical gripper to a next receptacle holding position within the same row of receptacle holding positions, within the same column of receptacle holding positions, within a next row of receptacle holding positions, or within a next column of receptacle holding positions.

According to further aspects of the disclosure, each of the first and second receptacle storage areas may include two or more receptacle racks removably supported on a rack supporting platform, and each receptacle rack includes a plurality of receptacle holding positions arranged in rows and columns. The controller may be programmed to advance the mechanical gripper to a next receptacle holding position within the next rack of the first or second storage area if no sample receptacle is detected at a prescribed number of consecutive respective receptacle holding positions.

According to further aspects of the disclosure, a portion of the first receptacle storage area comprising a contiguous group of receptacle holding positions is designated as a STAT section for holding STAT sample receptacles. The controller is programmed to first transfer all sample receptacles held in respective receptacle holding positions within the STAT section of the first receptacle storage area to the conveyer with the sample receptacle handling system before transferring sample receptacles held in remaining receptacle holding positions within the first receptacle storage area and before transferring sample receptacles held in receptacle holding positions within the second receptacle storage area.

According to further aspects of the disclosure, the controller is programmed so that, if, after all sample receptacles are removed from the STAT section of the first receptacle storage area with the sample receptacle handling system, additional sample receptacles are placed in receptacle holding positions of the STAT section while sample receptacles are being removed from remaining receptacle holding positions of the first receptacle storage area with the sample receptacle handling system or while sample receptacles are being removed from receptacle holding positions of the second receptacle storage area with the sample receptacle handling system, the removal of sample receptacles from the first or second receptacle storage areas is interrupted and the additional sample receptacles placed in the STAT section are removed with the sample receptacle handling system before resuming removal of sample receptacles from the first or second receptacle storage areas with the sample receptacle handling system.

According to further aspects of the disclosure, a portion of the second receptacle storage area comprising a contiguous group of receptacle holding positions is designated as a STAT section for holding STAT sample receptacles, and the controller is programmed to first transfer all sample receptacles held in respective receptacle holding positions within the STAT section of the second receptacle storage area to the conveyer with the sample receptacle handling system before transferring sample receptacles held in remaining receptacle holding positions within the second receptacle storage area and before transferring sample receptacles held in receptacle holding positions within the first receptacle storage area.

According to further aspects of the disclosure, the controller is programmed so that, if, after all sample receptacles are removed from the STAT section of the second receptacle storage area with the sample receptacle handling system, additional sample receptacles are placed in receptacle holding positions of the STAT section while sample receptacles are being removed from remaining receptacle holding positions of the second receptacle storage area with the sample receptacle handling system or while sample receptacles are being removed from receptacle holding positions of the first receptacle storage area with the sample receptacle handling system, the removal of sample receptacles from the second or first receptacle storage areas is interrupted and the additional sample receptacles placed in the STAT section are removed with the sample receptacle handling system before resuming removal of sample receptacles from the second or first receptacle storage areas with the sample receptacle handling system.

According to further aspects of the disclosure, the controller is programmed to control the sample receptacle handling system to remove sample receptacles from at least a portion of each row of receptacle holding positions of the first receptacle storage area, one row at a time, starting with the row that is closest to the first side of the first receptacle storage area, and to then remove sample receptacles from rows progressively farther from the first side of the first receptacle storage area.

According to further aspects of the disclosure, the controller is programmed to control the sample receptacle handling system to remove all sample receptacles from at least a portion of the columns of receptacle holding positions of the first receptacle storage area, one column at a time, starting with the sample receptacle within each column that is closest to the first side of the first receptacle storage area, and to then remove each sample receptacle from that column that is progressively farther from the first side of the first receptacle storage area.

According to further aspects of the disclosure, the controller is programmed to control the sample receptacle handling system to remove the sample receptacles from at least a portion of the columns of receptacle holding positions of the first receptacle storage area, one column at a time, starting with the column that is closest to the third side of the first receptacle storage area, and to then remove sample receptacles from columns progressively farther from the third side of the first receptacle storage area.

According to further aspects of the disclosure, the controller is programmed to control the sample receptacle handling system to remove all sample receptacles from each row of receptacle holding positions of the second receptacle storage area, one row at a time, starting with the row that is closest to the first side of the second receptacle storage area, and to then remove sample receptacles from rows progressively farther from the first side of the second receptacle storage area.

According to further aspects of the disclosure, the controller is programmed to control the sample receptacle handling system to remove all sample receptacles from each column of receptacle holding positions of the second receptacle storage area, one column at a time, starting with the sample receptacle within each column that is closest to the first side of the second receptacle storage area, and to then remove each sample receptacle from that column that is progressively farther from the first side of the second receptacle storage area.

According to further aspects of the disclosure, the controller is programmed to control the sample receptacle handling system to remove the sample receptacles from each column of receptacle holding positions of the second receptacle storage area, one column at a time, starting with the column that is closest to the third side of the second receptacle storage area, and to then remove sample receptacles from columns progressively farther from the third side of the second receptacle storage area.

According to further aspects of the disclosure, each of the first and second receptacle storage areas comprises two or more receptacle racks removably supported on a rack supporting platform, and each receptacle rack includes a plurality of receptacle holding positions arranged in rows and columns.

According to further aspects of the disclosure, each of the first and second receptacle storage areas comprise two or more receptacle racks removably supported on a rack supporting platform, each receptacle rack includes a plurality of receptacle holding positions arranged in rows and columns, and one rack of the first receptacle storage area is designated as a STAT rack for holding STAT sample receptacles. The controller is programmed to first transfer all sample receptacles from respective receptacle holding positions within the STAT rack to the conveyer with the sample receptacle handling system and before transferring sample receptacles from remaining receptacle holding positions within the first receptacle storage area and before transferring sample receptacles from receptacle holding positions within the second receptacle storage area.

According to further aspects of the disclosure, the controller is programmed such that, if, after all sample receptacles are removed from the STAT rack with the sample receptacle handling system, additional sample receptacles are placed in one or more receptacle holding positions of the STAT rack before all sample receptacles are removed from racks, other than the STAT rack, of the first receptacle storage area and/or the second receptacle storage area, the sample receptacle handling system is returned to the STAT rack to remove all sample receptacles held by the STAT rack before removing sample receptacles from racks, other than the STAT rack, of the first receptacle storage area and the second receptacle storage area.

According to further aspects of the disclosure, the system may include a switch configured to generate a signal detected by the controller when the STAT rack has been replaced, and the controller is programmed to transfer all sample receptacles from respective receptacle holding positions within the replaced STAT rack with the sample receptacle handling system before transferring sample receptacles from remaining receptacle holding positions within the first receptacle storage area and before transferring sample receptacles from receptacle holding positions within the second receptacle storage area.

According to further aspects of the disclosure, the racks of the first receptacle storage area are separated from the racks of the second receptacle storage area by a gap forming the first receptacle transport path.

According to further aspects of the disclosure, the system may include a first drawer supporting at least one rack of the first receptacle storage area and at least one rack of the second receptacle storage area and a second drawer supporting at least one rack of the first receptacle storage area and at least one rack of the second receptacle storage.

According to further aspects of the disclosure, the first receptacle storage area may include four receptacle racks arranged side-by-side between the third and fourth sides of the first receptacle storage area, and the four receptacle racks of the first receptacle storage area have aligned first sides corresponding to the first side of the first receptacle storage area and aligned second sides corresponding to the second side of the first receptacle storage area. The second receptacle storage area may include four receptacle racks arranged side-by-side between the third and fourth sides of the second receptacle storage area, and the four receptacle racks of the second receptacle storage area have aligned first sides corresponding to the first side of the second receptacle storage area and aligned second sides corresponding to the second side of the second receptacle storage area.

According to further aspects of the disclosure, the second receptacle transport path comprises a gap between two of the four receptacle racks of the first receptacle storage area, and the gap has a width of not less than the width of the widest receptacle holding position of the second receptacle storage area.

According to further aspects of the disclosure, the system may include a first drawer supporting two receptacle racks of the first receptacle storage area and two receptacle racks of the second receptacle storage area and a second drawer supporting two receptacle racks of the first receptacle storage area and two receptacle racks of the second receptacle storage area.

According to further aspects of the disclosure, a portion of the first receptacle storage area comprising a contiguous group of receptacle holding positions is designated as a quarantine section configured to receive sample receptacles placed therein by the sample receptacle handling system, and the controller is programmed to transfer selected ones of the sample receptacles from receptacle holding positions of the first or second receptacle storage area that are not within the quarantine section out of the first or second receptacle storage area, and to then transfer the selected sample receptacles to receptacle holding positions of the quarantine section.

According to further aspects of the disclosure, the controller is programmed to transfer selected sample receptacles to the quarantine section upon the occurrence of an error with respect to the selected sample receptacle.

According to further aspects of the disclosure, the error with respect to the selected sample receptacle may include one or more of: insufficient information is stored relating to the selected sample receptacle; no open test orders are stored for the selected sample receptacle; inability to read machine-readable information associated with the selected sample receptacle; insufficient head space within the selected sample receptacle; and insufficient sample materials contained within the selected sample receptacle.

According to further aspects of the disclosure, a portion of the first receptacle storage area comprising a contiguous group of receptacle holding positions is designated as a quarantine section configured to receive sample receptacles placed therein by the sample receptacle handling system, the second receptacle transport path comprises a column of empty receptacle holding positions of the quarantine section, and the controller is programmed to transfer selected ones of the sample receptacles from receptacle holding positions of the first or second receptacle storage area that are not within the quarantine section out of the first or second receptacle storage area, and to then transfer the selected sample receptacles to receptacle holding positions of the quarantine section other than the receptacle holding positions of the second receptacle transport path.

According to further aspects of the disclosure, each sample receptacle comprises a test tube.

According to further aspects of the disclosure, the system may include a plurality of receptacle holders, each receptacle holder being supported on the conveyor and configured to receive a sample receptacle and hold the sample receptacle in an upright orientation.

Aspects of the disclosure include a method of transferring each of a plurality of sample receptacles from a receptacle storage module to a conveyor situated adjacent to the receptacle storage module. The receptacle storage module may include a first receptacle storage area and a second receptacle storage area, each of the first and second receptacle storage areas has opposed first and second sides and opposed third and fourth sides oriented transversely to the first and second sides, and the first and second receptacle storage areas are arranged with the first side of the second receptacle storage area facing the second side of the first receptacle storage area. The first receptacle storage area may include a plurality of receptacle holding positions arranged in a series of parallel rows oriented in a first direction extending from the third side of the first receptacle storage area to the fourth side of the first receptacle storage area and a series of parallel columns oriented in a second direction extending from the first side of the first receptacle storage area to the second side of the first receptacle storage area. Each receptacle holding position of the first receptacle storage area is configured to hold a single sample receptacle and is spaced apart from any directly adjacent receptacle holding position by a distance that is less than the width of the narrowest receptacle holding position. The second receptacle storage area may include a plurality of receptacle holding positions arranged in a series of parallel rows oriented in a first direction extending from the third side of the second receptacle storage area to the fourth side of the second receptacle storage area and a series of parallel columns oriented in a direction extending from the first side of the second receptacle storage area to the second side of the second receptacle storage area. Each receptacle holding position of the second receptacle storage area is configured to hold a single sample receptacle and is spaced apart from any directly adjacent receptacle holding position by a distance that is less than the width of the narrowest receptacle holding position. The second side of the first receptacle storage area is spaced apart from the first side of the second receptacle storage area by a distance of not less than the width of the widest receptacle holding position of the second receptacle storage area, thereby defining a first receptacle transport path between the second side of the first receptacle storage area and the first side of the second receptacle storage area. The first receptacle storage area may include a second receptacle transport path extending from the first side of the first receptacle storage area to the second side of the first receptacle storage area, and the second receptacle transport path has a width of not less than the width of the widest receptacle holding position of the second receptacle storage area. The method may include controlling a sample receptacle handling system to transfer sample receptacles from the first receptacle storage area to the conveyor by moving each sample receptacle with the sample receptacle handling system from a respective receptacle holding position of the first receptacle storage area, over the first side of the first receptacle storage area, and to the conveyor, and each of the sample receptacles is removed from the first receptacle storage area in an order and via a pathway over the first side of the first receptacle storage area such that the removed sample receptacle does not pass over another sample receptacle held in a receptacle holding position within the first receptacle storage area. The method may also include controlling the sample receptacle handling system to transfer sample receptacles from the second receptacle storage area to the conveyer by moving each sample receptacle with the sample receptacle handling system from a respective receptacle holding position of the second receptacle storage area, over the first side of the second receptacle storage area, and into the first receptacle transport path, and moving each of the sample receptacles from the second receptacle storage area in an order and via a pathway over the first side of the second receptacle storage area and into the first receptacle transport path such that the removed sample receptacle does not pass over another sample receptacle held in a receptacle holding position within the second receptacle storage area. After the removed sample receptacle is transferred from the respective receptacle holding position of the second receptacle storage area into the first receptacle transport path, the sample receptacle handling system is controlled to move the sample receptacle for a distance necessary to align the removed sample receptacle with the second receptacle transport path and to then move the removed sample receptacle along the second receptacle transport path from the second side of the first receptacle storage area over the first side of the first receptacle storage area and to the conveyor.

According to further aspects of the disclosure, the second receptacle transport path may include a column of empty receptacle holding positions of the first receptacle storage area.

According to further aspects of the disclosure, transferring receptacles from the first receptacle storage area to the conveyer may include moving any sample receptacle from a respective receptacle holding position of the first receptacle storage area, other than a receptacle held in a respective receptacle holding position located in the row that is closest to the first side of the first receptacle storage area, over each of one or more intervening receptacle holding positions located between the respective receptacle holding position and the first side of the first receptacle storage area, and the sample receptacles will have been previously removed from the one or more intervening receptacle holding positions.

According to further aspects of the disclosure, moving each sample receptacle with the sample receptacle handling system from a respective receptacle holding position of the second receptacle storage area, over the first side of the second receptacle storage area, and into the first receptacle transport path, may include moving any sample receptacle from a respective receptacle holding position of the second receptacle storage area, other than a receptacle held in a respective receptacle holding position located in the row that is closest to the first side of the second receptacle storage area, over each of one or more intervening receptacle holding positions located between the respective receptacle holding position and the first side of the second receptacle storage area, and sample receptacles will have been previously removed from the one or more intervening receptacle holding positions.

According to further aspects of the disclosure, the pathway over which each sample receptacle is moved with the sample receptacle handling system from the respective receptacle holding position of the first receptacle storage area over the first side of the first receptacle storage area is predefined for each receptacle holding position of the first receptacle storage area. Also, the pathway over which each sample receptacle is moved with the sample receptacle handling system from the respective receptacle holding position of the second receptacle storage area over the first side of the second receptacle storage area and into the first receptacle transport path is predefined for each receptacle holding position of the second receptacle storage area.

According to further aspects of the disclosure, the sample receptacle handling system may include a mechanized robot including a mechanical gripper configured to grip an individual sample receptacle within a receptacle holding position and a gripper mover configured to effect movement of the gripper in a vertical direction and orthogonal horizontal directions.

According to further aspects of the disclosure, transferring a receptacle from the first receptacle storage area or transferring a receptacle from the second receptacle storage area may include controlling the sample receptacle handling system to remove sample receptacles from respective receptacle holding positions of the first receptacle storage area or the second receptacle storage area by attempting to grip a sample receptacle at the respective receptacle holding position with the mechanical gripper and to detect whether or not a sample receptacle is held at the respective receptacle holding position, and if no sample receptacle is detected at the respective receptacle holding position, to advance the mechanical gripper to a next receptacle holding position within the same row of receptacle holding positions, within the same column of receptacle holding positions, within a next row of receptacle holding positions, or within a next column of receptacle holding positions.

According to further aspects of the disclosure, each of the first and second receptacle storage areas may include two or more receptacle racks removably supported on a rack supporting platform, and each receptacle rack may include a plurality of receptacle holding positions arranged in rows and columns, and the method may include advancing the mechanical gripper to a next receptacle holding position within the next rack of the first or second storage area if no sample receptacle is detected at a prescribed number of consecutive respective receptacle holding positions. In one example, the prescribed number is five.

According to further aspects of the disclosure, a portion of the first receptacle storage area comprising a contiguous group of receptacle holding positions is designated as a STAT section for holding STAT sample receptacles. The method may include first transferring all sample receptacles held in respective receptacle holding positions within the STAT section of the first receptacle storage area to the conveyer with the sample receptacle handling system before transferring sample receptacles held in remaining receptacle holding positions within the first receptacle storage area and before transferring sample receptacles held in receptacle holding positions within the second receptacle storage area.

According to further aspects of the disclosure, if, after all sample receptacles are removed from the STAT section of the first receptacle storage area with the sample receptacle handling system, additional sample receptacles are placed in receptacle holding positions of the STAT section while sample receptacles are being removed from remaining receptacle holding positions of the first receptacle storage area or while sample receptacles are being removed from receptacle holding positions of the second receptacle storage area, the method may include interrupting the removal of sample receptacles from the first or second receptacle storage areas and removing the additional sample receptacles placed in the STAT section before resuming removal of sample receptacles from the first or second receptacle storage areas.

According to further aspects of the disclosure, a portion of the second receptacle storage area comprising a contiguous group of receptacle holding positions is designated as a STAT section for holding STAT sample receptacles. The method may include first transferring all sample receptacles held in respective receptacle holding positions within the STAT section of the second receptacle storage area to the conveyer with the sample receptacle handling system before transferring sample receptacles held in remaining receptacle holding positions within the second receptacle storage area and before transferring sample receptacles held in receptacle holding positions within the first receptacle storage area.

According to further aspects of the disclosure, if, after all sample receptacles are removed from the STAT section of the second receptacle storage area with the sample receptacle handling system, additional sample receptacles are placed in receptacle holding positions of the STAT section while sample receptacles are being removed from remaining receptacle holding positions of the second receptacle storage area or while sample receptacles are being removed from receptacle holding positions of the first receptacle storage area, the method may include interrupting the removal of sample receptacles from the second or first receptacle storage areas and removing the additional sample receptacles placed in the STAT section before resuming removal of sample receptacles from the second or first receptacle storage areas.

According to further aspects of the disclosure, transferring receptacles from the first receptacle storage area to the conveyer may include removing sample receptacles from at least a portion of each row of receptacle holding positions of the first receptacle storage area, one row at a time, starting with the row that is closest to the first side of the first receptacle storage area and then removing sample receptacles from rows progressively farther from the first side of the first receptacle storage area.

According to further aspects of the disclosure, transferring receptacles from the first receptacle storage area to the conveyer may include removing all sample receptacles from at least a portion of the columns of receptacle holding positions of the first receptacle storage area, one column at a time, starting with the sample receptacle within each column that is closest to the first side of the first receptacle storage area and then removing each sample receptacle from that column that is progressively farther from the first side of the first receptacle storage area.

According to further aspects of the disclosure, the sample receptacles are removed from each column of receptacle holding positions of the first receptacle storage area, one column at a time, starting with the column that is closest to the third side of the first receptacle storage area and then removing sample receptacles from columns progressively farther from the third side of the first receptacle storage area.

According to further aspects of the disclosure, moving each sample receptacle with the sample receptacle handling system from a respective receptacle holding position of the second receptacle storage area, over the first side of the second receptacle storage area, and into the first receptacle transport path, may include removing all sample receptacles from each row of receptacle holding positions of the second receptacle storage area, one row at a time, starting with the row that is closest to the first side of the second receptacle storage area and then removing sample receptacles from rows progressively farther from the first side of the second receptacle storage area.

According to further aspects of the disclosure, moving each sample receptacle with the sample receptacle handling system from a respective receptacle holding position of the second receptacle storage area, over the first side of the second receptacle storage area, and into the first receptacle transport path, may include removing all sample receptacles from each column of receptacle holding positions of the second receptacle storage area, one column at a time, starting with the sample receptacle within each column that is closest to the first side of the second receptacle storage area and then removing each sample receptacle from that column that is progressively farther from the first side of the second receptacle storage area.

According to further aspects of the disclosure, the sample receptacles are removed from each column of receptacle holding positions of the second receptacle storage area, one column at a time, starting with the column that is closest to the third side of the second receptacle storage area and then removing sample receptacles from columns progressively farther from the third side of the second receptacle storage area.

According to further aspects of the disclosure, each of the first and second receptacle storage areas may include two or more receptacle racks removably supported on a rack supporting platform, and each receptacle rack includes a plurality of receptacle holding positions arranged in rows and columns.

According to further aspects of the disclosure, each of the first and second receptacle storage areas may include two or more receptacle racks removably supported on a rack supporting platform, and each receptacle rack includes a plurality of receptacle holding positions arranged in rows and columns, wherein one rack of the first receptacle storage area is designated as a STAT rack for holding STAT sample receptacles. The method may include first transferring all sample receptacles from respective receptacle holding positions within the STAT rack with the sample receptacle handling system and before transferring sample receptacles from remaining receptacle holding positions within the first receptacle storage area and before transferring sample receptacles from receptacle holding positions within the second receptacle storage area.

According to further aspects of the disclosure, the method may include detecting when the STAT rack has been replaced and then transferring all sample receptacles from respective receptacle holding positions within the replaced STAT rack with the sample receptacle handling system before transferring sample receptacles from remaining receptacle holding positions within the first receptacle storage area and before transferring sample receptacles from receptacle holding positions within the second receptacle storage area.

According to further aspects of the disclosure, the racks of the first receptacle storage area are spaced apart from the racks of the second receptacle storage area by a gap forming the first receptacle transport path.

According to further aspects of the disclosure, at least one rack of the first receptacle storage area and at least one rack of the second receptacle storage area are supported on a first drawer and at least one rack of the first receptacle storage area and at least one rack of the second receptacle storage area are supported on a second drawer.

According to further aspects of the disclosure, the first receptacle storage area may include four receptacle racks arranged side-by-side between the third and fourth sides of the first receptacle storage area, and the four receptacle racks of the first receptacle storage area have aligned first sides corresponding to the first side of the first receptacle storage area and aligned second sides corresponding to the second side of the first receptacle storage area. According to further aspects of the disclosure, the second receptacle storage area may include four receptacle racks arranged side-by-side between the third and fourth sides of the second receptacle storage area, and the four receptacle racks of the second receptacle storage area have aligned first sides corresponding to the first side of the second receptacle storage area and aligned second sides corresponding to the second side of the second receptacle storage area.

According to further aspects of the disclosure, the second receptacle transport path may include a gap between two of the four receptacle racks of the first receptacle storage area, and the gap has a width of not less than the width of the widest receptacle holding position of the second receptacle storage area.

According to further aspects of the disclosure, the rack supporting platform may include a first drawer and a second drawer, the first drawer supports two receptacle racks of the first receptacle storage area and two receptacle racks of the second receptacle storage area, and the second drawer supports two receptacle racks of the first receptacle storage area and two receptacle racks of the second receptacle storage area.

According to further aspects of the disclosure, a portion of the first receptacle storage area comprising a contiguous group of receptacle holding positions is designated as a quarantine section configured to receive sample receptacles placed therein by the sample receptacle handling system, and the method may include the steps of transferring selected ones of the sample receptacles from receptacle holding positions of the first or second receptacle storage area that are not within the quarantine section out of the first or second receptacle storage area, as applicable, and then transferring the selected sample receptacles to receptacle holding positions of the quarantine section.

According to further aspects of the disclosure, the selected sample receptacles are transferred to the quarantine section upon the occurrence of an error with respect to the selected sample receptacle.

According to further aspects of the disclosure, the error with respect to the selected sample receptacle may include one or more of: insufficient information is stored relating to the selected sample receptacle, no open test orders are stored for the selected sample receptacle; inability to read machine-readable information associated with the selected sample receptacle; insufficient head space within the selected sample receptacle; and insufficient sample materials contained within the selected sample receptacle.

According to further aspects of the disclosure, a portion of the first receptacle storage area comprising a contiguous group of receptacle holding positions is designated as a quarantine section configured to receive sample receptacles placed therein by the sample receptacle handling system. The second receptacle transport path may include a column of empty receptacle holding positions of the quarantine section. The method may include the steps of transferring selected ones of the sample receptacles from receptacle holding positions of the first or second receptacle storage area that are not within the quarantine section out of the first or second receptacle storage area, as applicable, and then transferring the selected sample receptacles to receptacle holding positions of the quarantine section other than the receptacle holding positions of the second receptacle transport path.

According to further aspects of the disclosure, each sample receptacle may include a test tube.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The foregoing and other aspects of embodiments are described in further detail with reference to the accompanying drawings, where like reference numerals refer to like elements and the description for like elements shall be applicable for all described embodiments wherever relevant.

DETAILED DESCRIPTION

Figure 1:
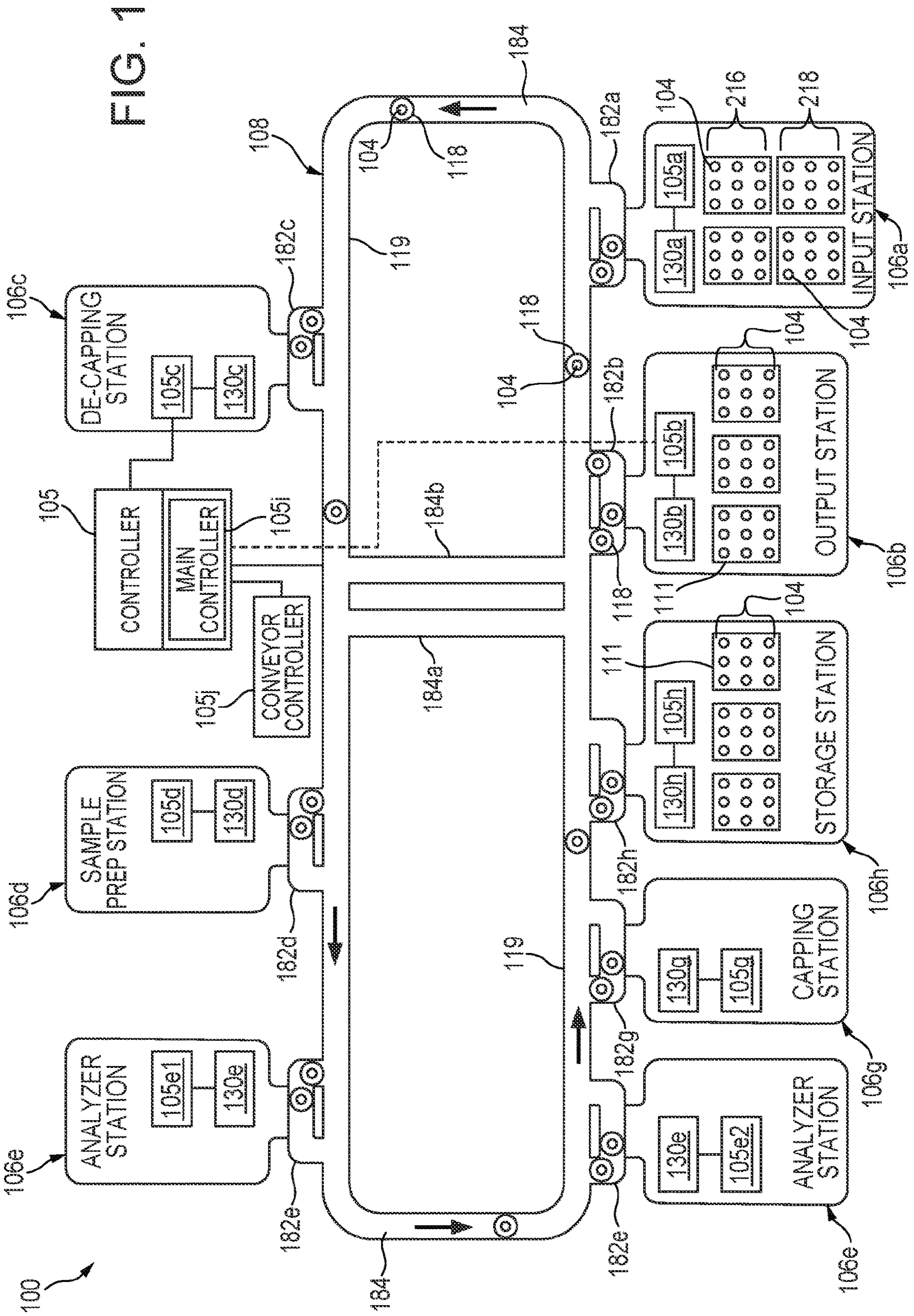
FIG. 1 is a schematic illustration of an exemplary automated analysis system for processing fluid samples contained in sample receptacles.

Unless defined otherwise, all terms of art, notations and other scientific terms or terminology used herein have the same meaning as is commonly understood by one of ordinary skill in the art to which this disclosure belongs. All patents, applications, published applications and other publications referred to herein are incorporated by reference in their entirety. If a definition set forth in this disclosure is contrary to, or otherwise inconsistent with, a definition in these references, the definition set forth in this disclosure prevails over the definitions that are incorporated herein by reference. None of the references described or referenced herein is admitted to be prior art to the current disclosure.

References in the specification to "one embodiment," "an embodiment," a "further embodiment," "an exemplary embodiment," "some aspects," "a further aspect," "aspects," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments, whether or not explicitly described. As used herein, "a" or "an" means "at least one" or "one or more."

As used herein, the term "sample" refers to any substance suspected of containing at least one analyte of interest. The analyte of interest may be, for example, a nucleic acid, a protein, a prion, a chemical, or the like. The substance may be derived from any source, including an animal, an industrial process, the environment, a water source, a food product, or a solid surface (e.g., surface in a medical facility). Substances obtained from animals may include, for example, blood or blood products, urine, mucus, sputum, saliva, semen, tears, pus, stool, nasopharyngeal or genitourinary specimen obtained with a swab or other collective device, and other bodily fluids or materials. The term "sample" will be understood to mean a specimen in its native form or any stage of processing.

As used herein, the term "receptacle" refers to any type of fluid container, including, for example, a tube, vial, cuvette, cartridge having one or more wells, microtiter plate, etc., that is configured to contain a sample or another fluid (collectively referred to herein as fluid). Tubes may be cylindrical (i.e., circular in cross-section) or non-cylindrical and may have flat or rounded bottoms. Non-limiting examples of exemplary receptacles include, for example, Aptima® urine specimen transport tube, Aptima® specimen transfer tube, BD Vacutainer®, etc.

As used herein, the term "gripper robot" refers to an electromechanical device, such as a pick-and-place device, configured to grasp an individual receptacle and translate the receptacle in the X, Y, and/or Z directions.

As used herein, the term "conveyor" refers to a mechanical apparatus for transporting articles (e.g., receptacles) from one location to another along a defined path. Non-limiting examples of exemplary conveyors include one or more of robots, belts, a shuttle/carriage moving on a track, a rail, or a belt, magnetic devices, gear systems, cable systems, vacuum systems, automated cars with wheels, etc.

As used herein, the term "assay" refers to a procedure for detecting and/or quantifying an analyte in a sample. A sample comprising or suspected of comprising the analyte is contacted with one or more reagents and subjected to conditions permissive for generating a detectable signal informative of whether the analyte is present or an amount (e.g., mass or concentration) of the analyte in the sample.

As used herein, the term "analyzer" refers to an automated instrument that is capable of performing one or more steps of an assay, including the step of determining the presence or absence of one or more analytes suspected of being present in a fluid sample.

As used herein, the term "analyte" refers to a molecule or substance that is detected or subjected to analysis in an assay. Exemplary analytes include nucleic acids, polypeptides, proteins, antigens, and prions.

As used herein, the term "molecular assay" refers to a procedure for specifically detecting and/or quantifying a target molecule, such as a particular nucleic acid. A sample comprising or suspected of comprising the target molecule is contacted with one or more reagents, including at least one reagent specific for the target molecule, and subjected to conditions permissive for generating a detectable signal informative of whether the target molecule is present. For example, where the molecular assay includes an amplification reaction, such as a polymerase chain reaction (PCR), the reagents include primers that may be specific for a target nucleic acid, and the generation of a detectable signal can be accomplished, at least in part, by providing a labeled probe that hybridizes to the amplicon produced by the primers in the presence of the target. Alternatively, the reagents can include an intercalating dye for detecting the formation of double-stranded nucleic acids.

As used herein, the term "reagent" refers to any substance or mixture that participates in an assay, other than sample material and products of the assay. Exemplary reagents for use in a molecular assay include nucleotides, enzymes, primers, probes, and salts.

FIG. 1 illustrates a schematic view of an automated analysis system 100 for processing a fluid sample 102 (see FIG. 2) contained in a sample receptacle 104. Exemplary automated analysis systems are described in International Application Nos. PCT/US2021/028719 and PCT/US2021// 028722. In this exemplary embodiment, the automated analysis system 100 is configured to process multiple sample receptacles 104. The automated analysis system 100 includes a plurality of stations 106, including an input station 106*a*, an output station 106*b*, a decapping station 106*c*, a sample prep station 106*d*, one or more analyzer stations 106*e* (two analyzer stations 106*e* are illustrated, although any suitable number of analyzer stations 106*e* may be employed in the automated analysis system 100, including only one), a capping station 106*g*, and a storage station 106*h*. The automated analysis system 100 may have any different numbers and types of stations 106 suitable for the intended use of the system 100, including having more than one of each type of station 106. The automated analysis system 100 also includes an automated conveyor system 108 which is configured to connect each of the stations 106 and to transport the sample receptacles 104 between the stations 106. Exemplary conveyor systems include those described in U.S. Pat. Nos. 9,766,258 and 9,776,811 and U.S. Patent Application Publication No. 2017/0254827 and are embodied in commercially available systems from FlexLink, Inpeco (Flexlab, FlexLab-HT, etc.), Integrated Drive Systems (e.g., IDS-CLAS-XI), Thermo Fisher Scientific, Hitachi, MagneMotion, GLP, and others.

Figure 2B:
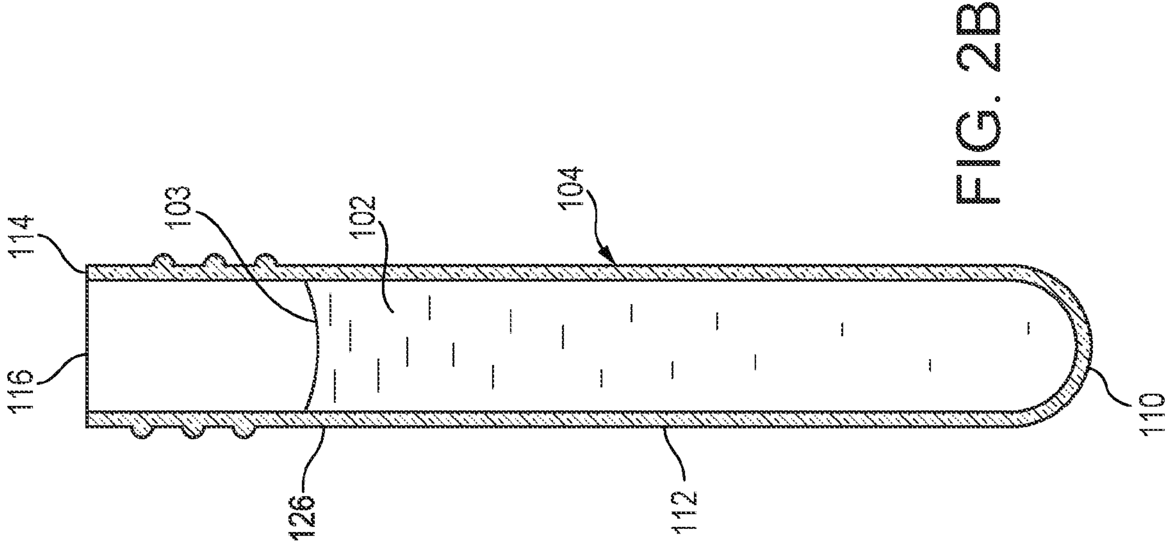
FIG. 2B is a cross-section of the sample receptacle of FIG. 2A.
Figure 2A:
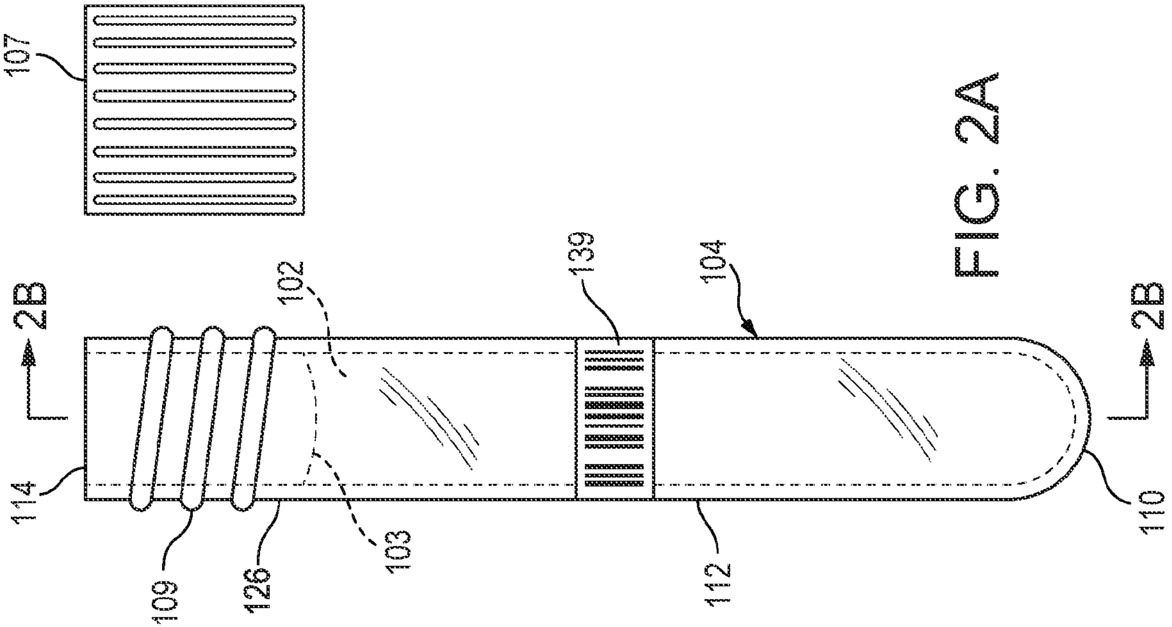
FIG. 2A is side view of an exemplary sample receptacle in the form of a sample tube and an associated cap.

In the illustrated embodiment, the automated analysis system 100 is configured to utilize sample tubes 104 (e.g., test tubes) as the sample receptacles 104. An exemplary sample tube 104 is shown in FIGS. 2A and 2B. The sample tube 104 is a cylindrical tube having a closed bottom 110, and a cylindrical receptacle wall 112 extending from the closed bottom 110 to a rim 114. The rim 114 defines an open top 116 of the sample tube 104. The sample tube 104 may have a threaded top portion 109 for attaching a cap 107 having mating threads. The sample receptacles 104 may be any suitable fluid sample receptacle having a closed bottom and a rim defining an open top. For instance, the sample receptacle 104 may be any other suitable fluid receptacle having a suitable shape and size. The sample tube 104 contains a fluid sample 102 having a top surface 103.

Figure 3:
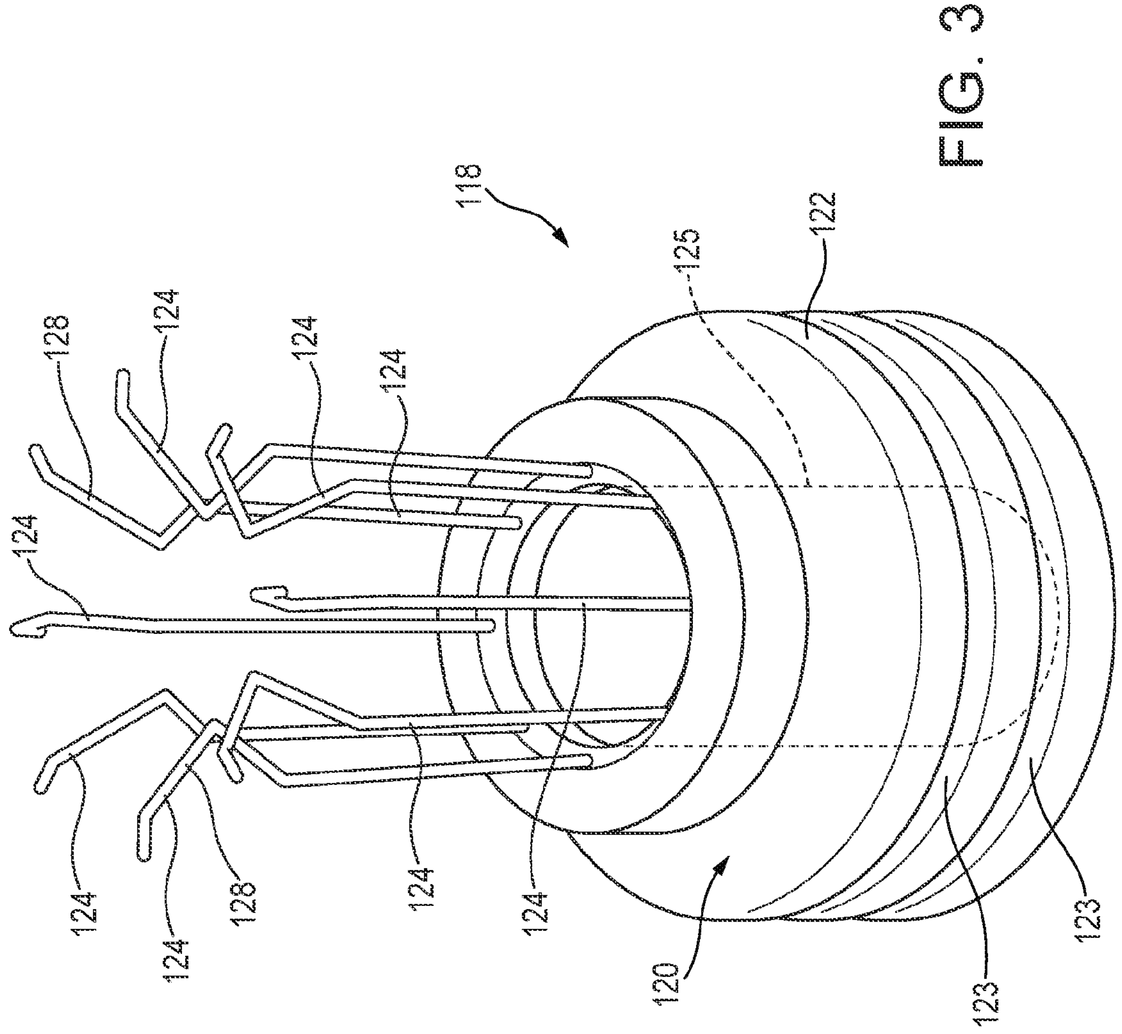
FIG. 3 is a perspective, front view of an exemplary sample receptacle holder.

The automated analysis system 100 utilizes a sample receptacle holder 118 to hold and transport the sample receptacle 104 around the conveyor system 108 of system 100. FIG. 3 illustrates an exemplary sample receptacle holder 118. The sample receptacle holder 118 is in the form of a generally cylindrical puck 120 having a cylindrical base 122. An exemplary puck is described in U.S. Patent Application Publication No. 2021/0061584. The base 122 of the puck 120 has a recess 125 which seats the closed bottom 110 of the sample receptacle 104. The base 122 may also have one or more grooves 123 configured to receive and slide along a pair of opposed rails of a conveyor track 119. The puck 120 also has a plurality of fingers 124 extending upwardly from the base 122 which are configured to support the sample receptacle 104 in a vertical orientation. The fingers 124 are arranged in a circular pattern to match the cylindrical shape of the sample receptacle 104. The fingers 124 extend to a point below the rim 114 of the sample receptacle 104 such that an upper portion 126 of the sample receptacle 104, including the rim 114, is above the fingers 124 and exposed. Top portion 128 of the fingers 124 are tapered inwardly from the top to provide a guide while inserting a sample receptacle 104 between the fingers 124 of the puck 120. The tapered top portion 128 also aids in deflecting the fingers 124 when sample receptacles 104 are inserted into the sample receptacle holder 118.

The automated analysis system 100 has a computerized controller 105 (e.g., a programmable logic controller, or PLC), which controls the operation of each of the components in order to integrate and coordinate the components involved in processing the fluid sample 102 contained in the sample receptacle 104, including for example, determining a level of the fluid sample 102 in the sample receptacle 104, determining whether to quarantine the sample receptacle 104, and/or performing one or more analytical procedures on the fluid sample 102. The controller 105 may include a main controller 105*i* and one or more sub-system controllers. For example, each station 106 may have a corresponding sub-system controller 105 (e.g., a programmable logic controller or "PLC") for controlling the respective station 106 and also coordinating with the main controller 105*i* and other sub-system controllers 105. Thus, the input station 106*a* has an input station controller 105*a*, the output station 106*b* has an output station controller 105*b*, the decapping station 106*c* has a decapping station controller 105*c*, the sample prep station 106*d* has a sample prep station controller 105*d*, the first analyzer station 106*e* has a first analyzer station controller 105*e*1, the second analyzer station 106*e* has a second analyzer station controller 105*e*2, the capping station 106*g* has a capping station controller 105*g*, the storage station has a storage station controller 105*h*, the conveyor system 108 has a conveyor controller 105*j*. The main controller 105*i* may be configured to address routing logic for each sample 102. For example, it may dictate a path or workflow through the system 100, such as a path including station 106*a*, station 106*c*, at least one station 106*e*, station 106*g*, and station 106*h*. The conveyor controller 105*j* may be configured to manage all the details on how to physically route each fluid sample 102 (and the sample receptacle 104 containing the respective fluid sample 102) to all required stations 106 as dictated by main controller 105*i*. The individual controllers 105 within the stations 106 monitor and control all the components of the respective stations, including sensors, motors and actuators, etc.

The stations 106 and conveyor system 108 are configured to handle and transport the sample receptacle holder 118, and a sample receptacle 104 received in the sample receptacle holder 118 (referred to collectively as a loaded sample receptacle holder 118), around the automated analysis system 100. The conveyor system 108 transports the loaded sample receptacle holders 118 between stations 106 of the automated analysis system 100. In an embodiment, automated conveyor system 108 is controlled by the conveyor controller 105*j* executing software called the Line Controller.

The conveyor system 108 may be any apparatus for conveying or otherwise facilitating the transportation of loaded sample receptacle holders 118 between stations 106 along a defined path. In the illustrated embodiment, the conveyor system 108 includes a conveyor track 119 and the conveyor controller 105*j*. The conveyor track 119 includes a main conveyor line 184, a plurality of branch lines 182*a*, 182*b*, 182*c*, 182*d*, 182*e*, 182*g*, 182*h*, respectively, associated with each station 106*a*, 106*b*, 106*c*, 106*d*, 106*e*, 106*g*, 106*h*, and one or more recirculation loops that include return lines 184*a*, 184*b*.

The main conveyor line 184 serves as the primary line for transporting the loaded sample receptacle holders 118 between the different stations 106 of the automated analysis system 100. In the illustrated embodiment, the main conveyor line 184 has a closed geometric shape (e.g., rectangular) that facilitates unidirectional movement of the loaded sample receptacle holders 118 (counterclockwise in the illustrated embodiment). In alternative embodiments, the main conveyor line 184 may be linear and/or bidirectional.

Each of the branch lines 182*a*, 182*b*, 182*c*, 182*d*, 182*e*, 182*g*, 182*h* can be used as a buffer queue for receiving and queueing one or more loaded sample receptacle holders 118 to be processed at the particular station 106*a*, 106*b*, 106*c*, 106*d*, 106*e*, 106*g*, 106*h*, respectively. The return lines 184*a*, 184*b* form closed inner loops which allow the loaded sample receptacle holders 118 to circulate while they await access to one or more of the stations 106*a*, 106*b*, 106*c*, 106*d*, 106*e*, 106*g*, 106*h*. For example, if a branch line 182 of a station 106 has a full queue of loaded sample receptacle holders 118, a loaded sample receptacle holder 118 waiting to be processed at such station 106 may be circulated on one of the inner loops including return line 184*a* or return line 184*b* until the queue of the branch line 182 has available space.

The conveyor controller 105*j* is configured for controlling the functions of the conveyor system 108, such as transporting the loaded sample receptacle holders 118 between the stations 106 of the automated analysis system 100. The main controller 105*i* may communicate with the conveyor controller 105*j* to instruct the conveyor controller 105*j* on the path each sample receptacle holder 118 is to be routed. Accordingly, the conveyor controller 105*j* may control the stations 106 to which the loaded sample receptacle holders 118 are transported and which stations 106 will be bypassed by the loaded sample receptacle holders 118. The conveyor controller 105*j* may communicate directly with each of the individual station controllers 105 to manage the workflow path of each sample receptacle holder 118.

Each station 106 is configured to receive, handle, and move the sample receptacle holder 118 and/or sample receptacle 104 within the respective station 106. For example, at least a portion of the stations 106 may include a respective sample receptacle handling system 130 for moving and/or manipulating the sample receptacle holders 118 and/or sample receptacles 104 within the respective stations 106. The receptacle handling system 130 may include a gripper robot, such as a pick-and-place device, or other type of transporter(s).

Figure 4:
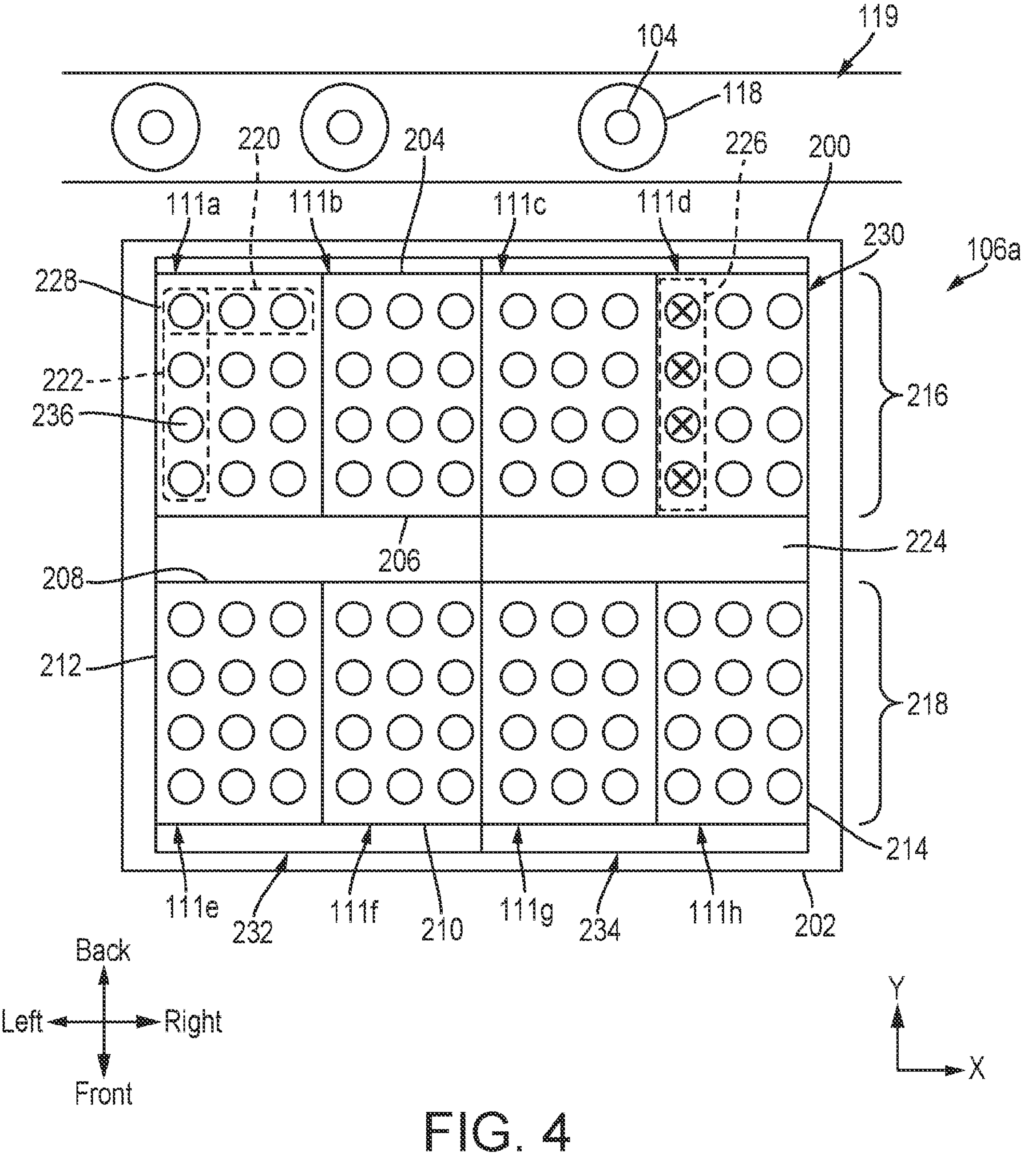
FIG. 4 is a schematic illustration of an exemplary receptacle storage module in the form of an input station of the automated analysis system.

Generally speaking, the input station 106*a* is a receptacle storage module that serves to receive and load sample receptacles 104 containing fluid samples 102 onto the automated analysis system 100. As shown in FIG. 4, the input station 106*a* has a first side 200 adjacent to branch line 182*a* of the conveyor track 119 and a second side 202 opposite the first side 200. Input station 106*a* may include a first receptacle storage area 216 located adjacent the first side 200 of the input station 106*a* (i.e., closer to first side 200 than to second side 202), which includes a first side 204, a second side 206 opposite the first side 204, a third side 212, and a fourth side 214 opposite the third side 212, wherein the third side 212 and fourth side 214 extend transversely to the first side 204 and second side 206. First receptacle storage area 216 includes a plurality of receptacle holding positions 236, arranged in parallel columns 222 that extend in a direction from the first side 204 to the second side 206 and parallel rows 220 that extend in a direction from the third side 212 to the fourth side 214. Input station 106*a* may include a second receptacle storage area 218 located adjacent the second side 202 of the input station 106*a* (i.e., closer to second side 202 than to first side 200), which includes a first side 208, a second side 210 opposite the first side 208, a third side 212 (coinciding with third side 212 of first receptacle storage area 216), and a fourth side 214 (coinciding with fourth side 214 of first receptacle storage area 216) opposite the third side 212, wherein the third side 212 and fourth side 214 extend transversely to the first side 208 and second side 210. Second receptacle storage area 218 includes a plurality of receptacle holding positions 236, arranged in parallel columns that extend in a direction from the first side 208 to the second side 210 and parallel rows that extend in a direction from the third side 212 to the fourth side 214.

Although FIG. 4 includes reference number 106*a*, which corresponds to the input station, the first and second storage areas and the first and second receptacle pathways illustrated in FIG. 4 may be implemented in any receptacle storage module in which the receptacle transfer algorithm and mechanisms described herein may be implemented, including the storage station 106*h* and the output station 106*b*.

Each receptacle holding position 236 may include a slot or opening into which a sample receptacle 104 may be inserted and which has a shape and width or diameter such that the receptacle wall 112 of the receptacle is supported by peripheral edge(s) of the opening (e.g., a circular opening for a cylindrical receptacle wall 112). As the input station 106*a* may be configured to handle sample receptacles 104 of varying sizes and shapes, the corresponding sizes and shapes of the receptacle holding positions 236 may vary accordingly.

First receptacle storage area 216 may comprise one or more receptacle racks 111*a*, 111*b*, 111*c*, 111*d*, each of which includes a plurality of receptacle holding positions 236. The receptacle holding positions 236 of each receptacle rack 111*a*, 111*b*, 111*c*, 111*d* are configured to support a plurality of sample receptacles 104 containing fluid samples 102, where the sample receptacles 104 may have the same or different configurations. Each receptacle rack 111*a*, 111*b*, 111*c*, 111*d* may be supported on a rack supporting platform. Second receptacle storage area 218 may comprise one or more receptacle racks 111*e*, 111*f*, 111*g*, 111*h*, each of which includes a plurality of receptacle holding positions 236. The receptacle holding positions 236 of each receptacle rack 111*e*, 111*f*, 111*g*, 111*h* are configured to support a plurality of sample receptacles 104 containing fluid samples 102, where the sample receptacles 104 may have the same or different configurations. Each receptacle rack 111*e*, 111*f*, 111*g*, 111*h* may be supported on a rack supporting platform. As used herein, the term "rack" may refer to any structure or platform configured to hold a plurality of sample receptacles in generally fixed receptacle holding positions defined by, for example, a plurality of openings or slots, each of which is configured to receive a single sample receptacle. The bottom 110 of each sample receptacle 104 is seated within the receptacle holding position 236, and the upper portion 126 of each sample receptacle 104 extends above a top-most part of the receptacle holding position 236 so that the upper portion 126 of each sample receptacle 104 can be grasped by a gripper mechanism of a sample receptacle handling system.

The receptacle storage areas 216, 218, or each of the receptacle racks 111*a*-111*h*, may be configured to hold any suitable number of sample receptacles 104, such as 50-500, 10-100, 10-50, etc., sample receptacles 104 per first and/or second receptacle storage area 216, 218 or per rack 111*a*-111*h*.

A "row" of receptacle holding positions may refer to a portion of a row of receptacle holding positions 236 of the first receptacle storage area 216 or second receptacle storage area 218, such as row 220 of a single rack 111*a* as shown in FIG. 4, or a "row" may refer to an entire line of receptacle holding positions extending from the third side 212 to the fourth side 214 of the first receptacle storage area 216 or second receptacle storage area 218.

The second side 106 of the first receptacle storage area 216 is spaced apart from the first side 208 of the second receptacle storage area 218 so as to form a first receptacle transport path 224 extending across the input station 106*a* between the third side 212 and the fourth side 214. Also, the input station 106*a* may include a second receptacle pathway 226 extending between the first side 204 and the second side 206 of the first receptacle storage area 216. Second receptacle pathway 226 may comprise a column of empty receptacle holding stations 236, and a sample receptacle handling system 130*a* of input station 106*a* is controlled to not place sample receptacles 104 in any receptacle holding station 236 within the second receptacle pathway 226. Alternatively, the second receptacle pathway 226 may comprise a gap between two portions of the first receptacle storage area 216, such as a gap between receptacle racks 111*c* and 111*d*.

The sample receptacle handling system 130*a* of input station 106*a* is configured to remove sample receptacles 104 from receptacle storage areas 216, 218 and to transfer each removed receptacle 104 into respective sample receptacle holder 118 supported on the main conveyor line 184 or branch line 182*a* of the conveyor track 119.

In an embodiment, each analyzer station 106*e* may be configured for processing the fluid samples 102 contained in the sample receptacles 104 by performing analytical tests on at least an aliquot of the specimens. Such tests may include molecular assays (e.g., nucleic acid-based assays), sequencing assays, immunoassays, chemical analyses, etc. Non-limiting examples of such analyzer stations 106*e* are described in U.S. Pat. Nos. 8,731,712 and 9,732,374, and in International Publication No. WO 2019/014239, and are embodied in the PANTHER® and PANTHER FUSION® systems available from Hologic, Inc. (Marlborough, Massachusetts). Each analyzer station 106*e* may include a sample receptacle handling system 130*e* that is configured to transfer a sample receptacle 104 from a sample receptacle holder 118 on the conveyor system 108 into the analyzer station 106*e*. The sample receptacle handling system 130*e* may also be configured to transfer a sample receptacle 104 from the analyzer station 106*e* into a sample receptacle holder 118 on the conveyor system 108 for further processing. In the illustrated embodiment, each analyzer station 106*e* may be configured for receiving sample receptacles 104 via automated loading (using the conveyor system 108) or manual loading through a sample bay (not shown). An example of automated loading of sample receptacles is described in International Publication No. WO 2020/226969.

The analyzer stations 106*e* may be specialized or redundant to allow higher throughput of analytical tasks on the fluid samples 102 contained in the sample receptacles 104. Typically, an analyzer station 106*e* extracts a liquid or liquefied fluid sample 102 from a sample receptacle 104 and combines the fluid sample 102 with reagents in reaction vessels, such as cuvettes, tubes, vials, microtiter plates, etc., after which the vessels may be scaled, capped or otherwise closed. After combining the specimens with the reagents, the contents of the reaction vessels are subjected to a series of test conditions.

Controller 105, which may work in conjunction with analyzer station controllers 105*e*1 and 105*e*2, may be programmed to schedule processing of fluid samples 102 in analyzer stations 106*e*, including determining whether a particular sample receptacle 104 is diverted from the main conveyor line 184 to the branch line 182*e* associated with a particular analyzer 106*e*. Exemplary programming and methods for scheduling processing of fluid samples in analyzer stations are described in International Application No. PCT/US2021/028722.

The sample prep station 106*d* is configured to prepare a fluid sample 102 contained in a sample receptacle 104 for testing in one or more of the analyzer stations 106*e*. For instance, the sample prep station 106*d* may be an aliquoting module configured for transferring a portion of fluid sample 102 from one type of sample receptacle (e.g., a receptacle having a different shape or volume than sample receptacle 104) to another type of sample receptacle (e.g., sample receptacle 104) for use by at least one of the analyzer stations 106 to perform a test on the transferred fluid sample 102. An exemplary aliquoting module is described in U.S. Pat. No. 9,335,336. The sample prep station 106 may also combine a fluid sample 102 (or portion thereof) with reagents from another receptacle (e.g., a bulk reagent receptacle), in order to prepare the fluid sample 102 for testing in at least one of the analyzer stations 106. Thus, the sample prep station 106*d* may include one or more pipettors (not shown) that aspirate and dispense fluid sample 102 and/or reagents. A non-limiting example of a sample prep station 106*d* is the TOMCAT® instrument sold by Hologic, Inc., Marlborough, Massachusetts. The sample prep station 106*d* may include a sample receptacle handling system 130*d* that is configured to transfer a sample receptacle 104 from the sample prep station 106*d* into a sample receptacle holder 118 on the conveyor system 108 for further processing.

The storage station 106*h*, which may function as a receptacle storage module, is configured to automatically load, store, and unload sample receptacles 104, for example, completed sample receptacles 104 (i.e., sample receptacles 104 containing fluid samples 102 for which the workflow has been completed), and/or sample receptacles 104 containing fluid samples 102 that are tested in low frequency (sample receptacles requiring the same test are stored until there is a sufficient number of such fluid samples 102 for testing). The storage station 106*h* is configured to handle and store a plurality of receptacle racks 111 (or other receptacle racks configured to hold a plurality of sample receptacles 104). Some racks 111 may be filled to capacity with sample receptacles 104, while others may have openings for receiving additional sample receptacles 104 to be stored in the storage station 106*h*. A sample receptacle handling system 130*h* of the storage station 106*h* is configured to transfer a sample receptacle 104 from sample receptacle holder 118 on the conveyor system 108 into a receptacle rack 111 within the storage system 106*h* in order to store such sample receptacle 104. The sample receptacle handling system 130*h* may also be configured to transfer a stored sample receptacle 104 from a receptacle rack 111 within the storage system 106 into a sample receptacle holder 118 in order to load such sample receptacle 104 onto the conveyor system 108 for further processing. An exemplary storage station, as well as other features of an automated analysis system for processing a fluid sample, are disclosed in International Application No. PCT/US2021/028721.

The decapping station 106*c* is configured for removing caps 107 from the sample receptacles 104 (one example is shown in FIG. 2A) prior to processing the fluid samples 102 contained therein. Examples of suitable decapping stations are described in U.S. Pat. Nos. 6,321,619 and 7,152,504. In the illustrated embodiment, the decapping station 106*c* is situated along the main conveyor line 184 before the sample prep station 106*d* and analyzer stations 106*e*. The decapping station 106*c* may include a sample receptacle handling system 130*c* that is configured to transfer a sample receptacle 104 from a sample receptacle holder 118 on the conveyor system 108 into the decapping station 106*c*. The sample receptacle handling system 130*c* may also be configured to transfer a sample receptacle 104 from the decapping station 106*c* into a sample receptacle holder 118 on the conveyor system 108 for further processing. The decapping station 106*c* may be capable of removing different types of caps from capped sample receptacles 104 and, in some embodiments, the decapping station 106*c* may be capable of removing only a single type of cap 107 from the sample receptacles 104. In the latter case, multiple decapping stations 106*c*, each being capable of removing a different type of cap 107 from capped sample receptacles 104, may be provided along the main conveyor line 184. In addition, the sample receptacles 104 may have pierceable caps (not shown), and such sample receptacles 104 may bypass or pass through the decapping station 106*c* and be transported directly to the sample prep station 106*d* and/or analyzer stations 106*e* for processing.

The capping station 106*g* is configured for installing caps 107 (e.g., replacement caps or stoppers) onto open-ended sample receptacles 104, for example, after extracting fluid samples from the sample receptacles 104 in the analyzer stations 106*e*. Examples of suitable capping stations are described in U.S. Pat. Nos. 6,321,619 and 7,152,504. In the illustrated embodiment, the capping station 106*g* is situated along the main conveyor line 184, and it is situated between the analyzer stations 106*e* on one side and the storage station 106*h* and the output station 106*b* on the other side. The capping station 106*g* may include a sample receptacle handling system 130*g* that is configured to transfer a sample receptacle 104 from a sample receptacle holder 118 on the conveyor system 108 into the capping station 106*g*. The sample receptacle handling system 130*g* may also be configured to transfer a sample receptacle 104 from the capping station 106*g* into a sample receptacle holder 118 on the conveyor system 108 for further processing. The capping station 106*g* may be capable of installing different types of caps 107 to open-ended sample receptacles 104 and, in some embodiments, the capping station 106*g* may be capable of coupling only a single type of cap 107 to the open-ended sample receptacles 104. In the latter case, multiple capping stations 106*g*, each being capable of installing a different type of cap 107 to open-ended sample receptacles 104, may be provided along the main conveyor line 184. Sample receptacles 104 may have pierceable caps (not shown) and such sample receptacles 104 may bypass or pass through the capping station 106*g* en route to the storage station 106*h* or the output station 106*b*.

The output station 106*b* is configured to receive sample receptacles 104 and remove them from the conveyor system 108 and may also function as a receptacle storage module. For example, the sample receptacles 104 may be removed from the track 119 (main conveyor line 184 or branch line 182*b*) and transferred to the output station 106*b* after their fluid samples 102 have been processed on the automated analysis system 100, or because the sample receptacle 104 is rejected, or for some other reason. The output station 106*b* is configured to use a sample receptacle handling system 130*b* of the output station 106*b* to remove sample receptacles 104 from their respective sample receptacle holders 118 on the conveyor system 108 and place the sample receptacles 104 into receptacle racks 111 (or other receptacle holders). Once the racks 111 are sufficiently filled with sample receptacles 104, the racks 111 may be removed from the output station 106, thereby removing the sample receptacles 104 from the automated analysis system 100.

Referring to FIGS. 4-8, the input station 106*a* will now be described in more detail.

The input station 106*a* is configured to load sample receptacles 104 containing fluid samples 102 onto the automated analysis system 100. In one embodiment, the sample receptacles 104 containing fluid samples 102 are loaded into the first and second receptacle storage areas 216, 218, for example, by placing receptacle racks 111*a*-111*h* configured to hold a plurality of sample receptacles 104 in the input station 106*a*. In one embodiment, input station 106*a* may include one or more drawers that may be opened, e.g., from second side 202, to provide access to receptacle holding positions 236 of the first and second receptacle storage areas 216, 218 or to permit receptacle racks to be placed in or removed from the input station 106*a*. In one embodiment, receptacle racks 111*a* and 111*b* of the first receptacle storage area 216 and receptacle racks 111*e* and 111*f* of the second receptacle storage area 218 are supported on a first drawer 232, and receptacle racks 111*c* and 111*d* of the first receptacle storage area 216 and receptacle racks 111*g* and 111*h* of the second receptacle storage area 218 are supported on a second drawer 234.

The input station 106*a* has an input station controller 105*a* which controls the operation of the input station 106*a*, and, in particular, the sample receptacle handling system 130*a*. After a sample receptacle 104 is removed from a respective receptacle holding position 236 of one of the first and second receptacle storage areas 216, 218, or from a receptacle rack 111*a*-111*h*, in the input station 106*a*, the removed receptacle 104 is taken out of the input station 106*a* (storage module) and is transferred to and inserted into a sample receptacle holder 118 on the main conveyor line 184 or branch line 182*a*.

In one example, a portion 228 of the receptacle holding positions 236 of the first receptacle storage area 216, such as receptacle rack 111*a*, may be designated to hold STAT sample receptacles requiring urgent processing. Alternatively, or in addition, a portion of the receptacle holding positions 236 of the second receptacle storage area 218, such as receptacle rack 111*e*, may be designated to hold STAT sample receptacles requiring urgent processing.

In another example, a portion 230 of the receptacle holding positions 236 of the first receptacle storage area 216, such as receptacle rack 111*d*, may be designated as a "quarantine" section. The receptacle holding positions 236 of the quarantine section 230 are initially empty (e.g., rack 111*d* is loaded into the input station 106*a* empty) and sample receptacles that are removed from the input station but, for one or more reasons, cannot be processed by the automated analysis system 100, are returned to the input station 106*a* by the sample receptacle handling system 130*a* and placed in a receptacle holding position 236 within the quarantine section 230. In an embodiment, the second receptacle pathway 226 comprises a column of receptacle holding positions 236 within the quarantine section 230 (e.g., a column of receptacle holding positions 236 of receptacle rack 111*d*), and the sample receptacle handling system 130*a* is controlled to not place sample receptacles 104 in any receptacle holding station 236 within the second receptacle pathway 226.

The input station 106*a* may include, or be associated with, systems and/or subsystems for characterizing the sample receptacle to determine sample receptacle characteristics for the sample receptacle 104, which are used to generate sample receptacle data. For example, such characterizing systems and/or subsystems of the input station 106*a* may determine sample receptacle height, diameter, bottom profile, fluid level/head space (if the receptacle is uncapped) within the sample receptacle 104, the tilt angle of a sample receptacle 104 with respect to a receptacle holder 118, and a barcode ID. An input station including such systems and subsystems, such as a fluid level measuring system and a sample receptacle detector system, is described in International Application No. PCT/US2021/028719. The sample receptacle data may be transmitted to the conveyor controller 105*j*, which may convey the sample receptacle data up to the main controller 105*i* for instructions. In an embodiment main controller 105*i* executing software call the Workflow Management Software determines the open test orders for the sample receptacle 104 and may transmit routing instructions for the sample receptacle 104 to conveyor controller 105*j*. The main controller 105*i* executing the Workflow Management Software instructs the conveyor controller 105*j* executing the Line Controller software which station 106 to route a sample receptacle 104 to next in the workflow. The conveyor controller 105*j* executing the Line Controller software then handles all the low-level logic and communications with conveyors and individual station controllers 105 (PLCs) to physically route the sample receptacle 104 to the correct station 106. Once the sample receptacle 104 arrives at the correct station 106, the station controller 105 queries the conveyor controller 105*j* and Line Controller software where to route the sample receptacle 104 to next. Then Line Controller software queries the Workflow Management Software. The Workflow Management Software looks up the stored meta data for the sample receptacle 104 and determines the next station 106 the sample receptacle 104 should be routed to next. And this process continues.

The input station controller 105*a* is operably coupled to components of the input station 106*a* in order to receive data signals for the components, process the data signals, and control the operation of the input station 106*a* based on the data signals and programmed algorithms for moving sample receptacles into and out of the input station 106*a* in a time-and-space efficient manner while minimizing the possibility of contamination between sample receptacles 104.

Figure 5:
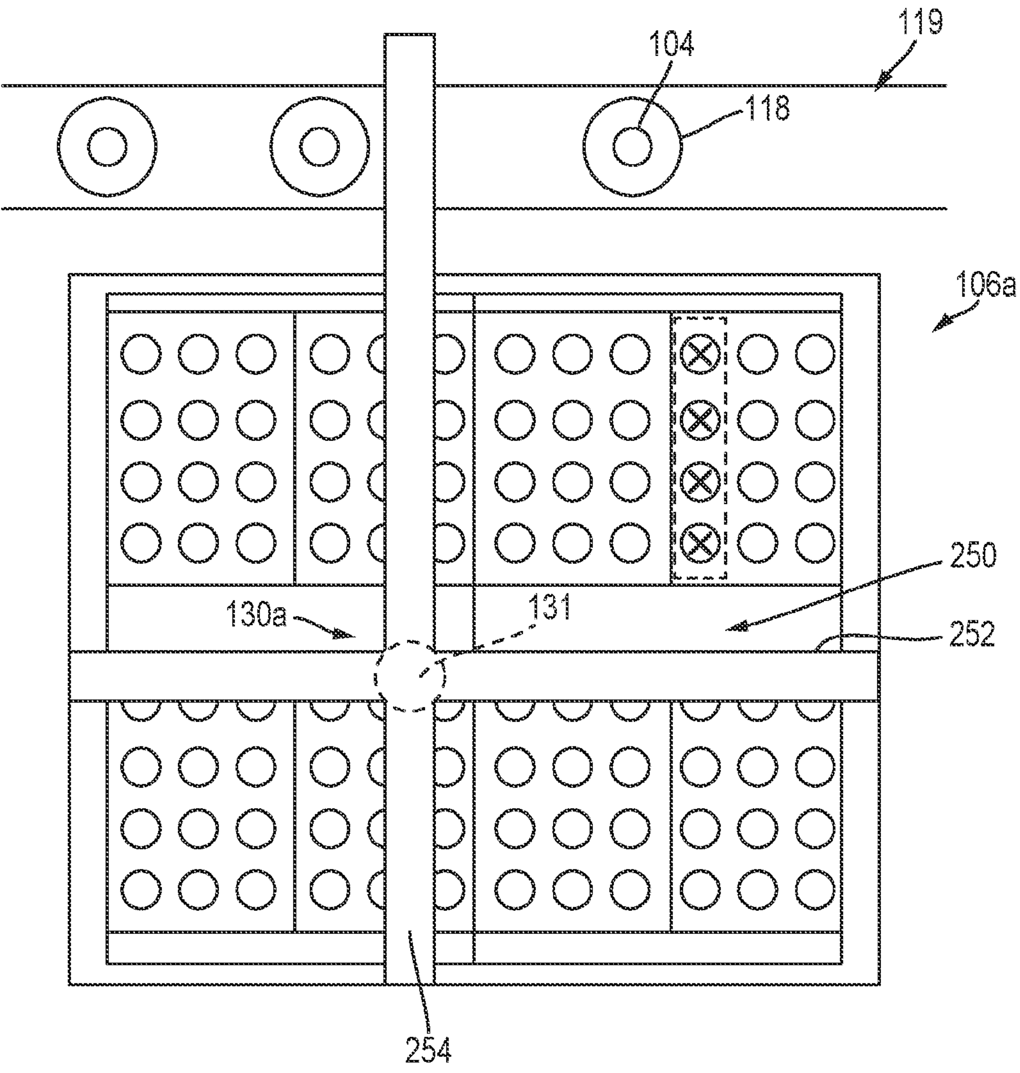
FIG. 5 is a schematic illustration of the exemplary input station and sample receptacle transfer system of the automated analysis system.
Figure 6:
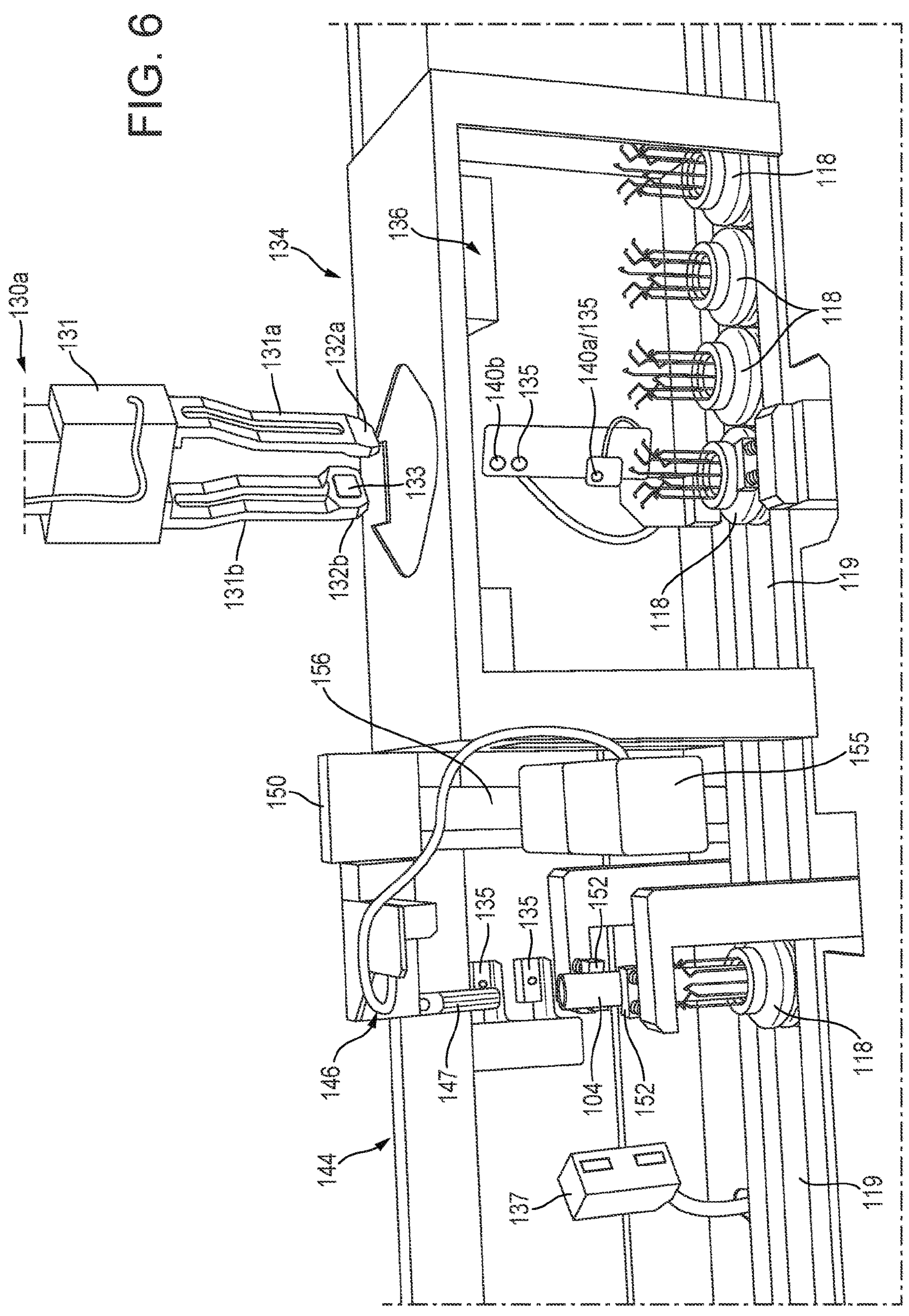
FIG. 6 is a perspective view of a track supporting a plurality of receptacle holders, one of which is loaded with a sample receptacle, and associated components adjacent the input station.

FIG. 5 is a top, schematic view of the input station 106*a*, and FIG. 6 is a perspective view of the conveyor track 119 supporting a plurality of receptacle holders 118, one of which is loaded with a sample receptacle 104, and associated components adjacent the input station 106*a* (input station 106*a* is not visible in FIG. 6).

As shown in FIGS. 5 and 6, the sample receptacle handling system 130*a* of the input station 106*a* may include a gripper robot including a mechanical gripper 131, configured to grip individual sample receptacles 104 within receptacle holding positions, and a gripper mover 250 configured to effect movement of the gripper in a vertical direction and orthogonal horizontal directions to move the sample receptacles 104 from the first or second receptacle storage areas 216 or 218 into a respective sample receptacle holder 118 on main conveyor line 184 or branch line 182*a* of conveyor track 119. The gripper robot may be any suitable robot for removing sample receptacles 104 from receptacle holding positions 236 and inserting them into sample receptacle holders 118, such as a pick-and-place robot including opposed, translatable gripper fingers 131*a*, 131*b*, or the like. Gripper fingers 131*a*, 131*b* may have gripper segments 132*a*, 132*b* at their respective distal ends, and each gripper segment 132*a*, 132*b* may include a gripper surface (only one gripper surface 133 is visible in FIG. 6) that contacts the opposed walls 112 of the receptacle 104 when the receptacle is grasped between the gripper fingers 131*a*, 131*b*. The gripper robot may be configured to move the mechanical gripper 131, and any receptacle 104 held thereby, in a vertical or Z-direction, e.g., to move the receptacle 104 into or out of the receptacle holding position, and in a horizontal X- and Y-direction, e.g., to move the receptacle out of or into the input station 106*a* and to and from a receptacle holder 118 on the main conveyor line 184 or branch line 182*a* of conveyor track 119. In an exemplary embodiment, the gripper mover 250 may include a first gantry 252 extending across the input station 106*a* in the X-direction and configured for movement in the Y, or back to front, direction and a second gantry 254 extending in the Y direction and configured for movement in the X, or side to side, direction. The mechanical gripper 131 is disposed below the first and second gantries 252, 254, and the gripper mover 250 includes a suitable mechanism, such as a piston, lead screw, or belt for actuating the gripper in a vertical or Z direction.

An exemplary mechanical gripper 131 is described in U.S. Provisional Application No. 63/104,401.

In general, to transfer a sample receptacle 104 from the input station 106*a* to a receptacle holder 118 on the main conveyor line 184 or branch line 182*a* of the conveyor track 119, the receptacle handling system 130*a* is configured and is controlled by controller 105*a* to selectively:

(a) position the mechanical gripper 131 with the first and second gantries 252, 254 at a position above a selected receptacle 104 held in a corresponding receptacle holding position 236;

(b) open the gripper fingers 131*a*, 131*b* so that a spacing between the gripper surfaces 133 of the gripper segments 132*a*, 132*b* is greater than the width of the selected receptacle 104 or an associated cap 107;

(c) lower the mechanical gripper 131 with the mover 250 to position the gripper segments 132*a*, 132*b* of the gripper fingers 131*a*, 131*b* adjacent the opposed walls 112 of the receptacle 104;

(d) close the gripper fingers 131*a*, 131*b* to grasp the selected receptacle 104 between the gripper segments 132*a*, 132*b;*

(e) raise the mechanical gripper 131 with the mover 250 to lift the receptacle 104 out of the receptacle holding position 236;

(f) translate the mechanical gripper 131 and receptacle 104 held thereby horizontally with one or both gantries 252, 254 past the first side 200 of the input station 106*a* to a position above a receptacle holder 118 on the conveyor track 119;

(g) lower the mechanical gripper 131 with the mover 250 to insert the receptacle 104 into the receptacle holder 118;

(h) open the gripper fingers 131*a*, 131*b* so that a spacing between the gripper surfaces 133 of the gripper segments 132*a*, 132*b* is greater than the width of the selected receptacle 104 or associated cap 107; and (i) raise the mechanical gripper 131 with the mover 250 away from the receptacle 104.

As shown in FIG. 6, a sample receptacle detector system 134, including detectors 136, may be positioned and configured to detect physical characteristics of the sample receptacle 104 before the sample receptacle 104 is inserted into the sample receptacle holder 118 or after it is inserted into the sample receptacle holder 118. For instance, in the former case, the mechanical gripper 131 of input station 106*a* can retrieve the sample receptacle 104 from within the input station 106*a* and move the sample receptacle 104 into a detection zone of the detector(s) 136, and the detector(s) 136 are activated to detect one or more physical characteristics of the sample receptacle 104. In the latter case, the loaded sample receptacle holder 118 is moved on main conveyor line 184 or branch line 182*a* of conveyor track 119 into the detection zone of the detector(s) 136, and the detector(s) 136 are activated to detect one or more physical characteristics of the sample receptacle 104.

Detectors 136 may include at least one high-resolution detector capable of submillimeter resolution. The at least one high-resolution detector 136 may be a wide laser measurement sensor, also known as a "laser curtain" (e.g., the ZX-GT Smart Sensor from OMRON® Corp.), a 2D laser profiler, an imaging device (e.g., a CCD sensor-based camera or CMOS sensor camera), or a single point distance measurement sensor (e.g., the Confocal Displacement Sensor CL-3000 Series from KEYENCE).

Detectors 136 may include an array of light sensors, such as light sensors 140*a*, 140*b*, arranged in vertical alignment, and the sample receptacle 104 may be placed in a detection zone of the array of light sensors in order to detect a height of the sample receptacle 104. Light sensors 140*a* and 140*b* may be reflective sensors with a built-in emitter/receiver, reflective fiber optical sensors, or the like. The sample receptacle detector system 134 can determine a height of the sample receptacle 104, among several different expected heights, by determining which of light sensors 140*a* or 140*b* (or additional sensor(s)) is interrupted by a portion of the sample receptacle 104 when the sample receptacle 104 is inserted into the detection zone of the array of light sensors. If the receptacle detector system 134 includes a high-resolution detector 136, then the high-resolution detector may be in addition to or in lieu of the array of light sensors 140*a*, 140*b*. Unlike the array of light sensors, a high-resolution detector 136 may be used to detect a shape of the sample receptacle 104 or to determine the dimensions of the sample receptacle 104.

By knowing the height of a sample receptacle 104, the corresponding volume capacity of the sample receptacle 104 can also be known.

The sample receptacle detector system 134 may include one or more cap detectors 135 (the cap detectors 135 being positioned to detect caps 107 associated with sample receptacles 104 of different sizes) to determine the presence or absence of a cap by determining whether a sample tube 104 has a cap 107 secured to the open top 116 thereof. The cap detectors 135 may be reflective fiber optical sensors, emitter/receiver paired sensors, or other suitable sensor. The sample receptacle detector system 134 may also be configured to send an output signal representative of the cap status of the sample tube 104 to the controller 105.

A fluid level measuring system 144 includes a distance sensor 146 configured to measure distance from the sensor to a feature. The distance sensor 146, which may have a beam columnator 147, is oriented vertically downward and measures a vertical distance from the distance sensor 146 to a surface, such as the rim 114 of the sample receptacle 104 (known or determined not to have a cap secured to the open end 116 of the sample receptacle 104), the top surface 103 of the fluid sample 102, or other desired surface. The fluid level measuring system 144 may also include one or more cap detectors 135 (the cap detectors 135 being positioned to detect caps 107 associated with sample receptacles 104 of different sizes) to determine the presence or absence of a cap by determining whether a sample tube 104 has a cap 107 secured to the open top 116 thereof. An exemplary fluid level measuring system is described in International Application No. PCT/US2021/028719.

In an embodiment, the distance sensor 146 may be supported by a horizontal linear translator 150. The horizontal linear translator 150 may be a linear stage which controllably moves the distance sensor 146 relative to a stationary sample receptacle 104 and provides a horizontal stage position signal representing a horizontal position of the stage 150. Accordingly, the horizontal position of the distance sensor 146 may be determined from the horizontal stage position signal. The horizontal linear translator 150 may be operably coupled to the input station controller 105*a* which controllably actuates the horizontal linear translator 150 and receives the horizontal stage position signal.

The distance sensor 146 may also be supported by a vertical linear translator stage 156 that is operated by a stage motor 155 and moves the distance sensor 146 vertically relative to the sample receptacle 104. The vertical linear translator 156 adjusts the position of the distance sensor 146 so that it is positioned within a distance measuring range of the distance sensor 146. The vertical linear translator 156 may also be a linear stage which controllably moves the distance sensor 146 vertically relative to the stationary sample receptacle 104 and provides a vertical stage position signal representing a vertical position of the stage. Accordingly, the vertical position of the distance sensor 146 may be determined from the vertical stage position signal. The vertical linear translator 156 may be operably coupled to the controller 105*a* which controllably actuates the vertical linear translator 156.

In order to precisely position and orient the sample receptacle 104 for performing a measurement scan of the sample receptacle 104 and fluid sample 102, the fluid level measuring system 144 may also include a receptacle clamp 152 configured to grasp the sample receptacle 104 and center the sample receptacle 104 in a measurement position. The receptacle clamp 152 positions a center of the sample receptacle 104 on a scanning axis of the distance sensor 146 and horizontal linear translator 150. This ensures that the distance sensor 146 consistently measures the sample receptacles 104 along the center of the sample receptacles 104. For example, for sample tubes 104, as shown in FIGS. 2A-2B, the distance sensor 146 scans along a diameter of each sample tube 104. The receptacle clamp 152 is configured to orient the sample receptacle 104 vertically, such that a center axis of the sample receptacle 104 is generally vertical during the measurement scan. Nevertheless, it is possible for the sample receptacle 104 to be tilted at an angle relative to vertical when it is received within the sample receptacle holder 118 should the receptacle clamp 152 improperly grasp (or not grasp) the sample receptacle 104. Because of this possibility, a measurement scan may be performed using the distance sensor 146 to (i) determine a level of fluid sample 102 relative to the rim 114 and/or (ii) determine a tilt angle of the sample receptacle 104, as describe herein.

The sample receptacle detector system 134 may also include a reader (not shown) configured to read machine-readable indicia 139 (see FIG. 2B), such as a barcode, machine-readable text, etc. on the sample receptacle 104. The indicia may be oriented horizontally as shown, or the indicia may be rotated 90 degrees and oriented vertically. Alternatively, or in addition, a reader 137 may be located on (or be otherwise associated with) the fluid level measuring system 144 of the input station 106*a*, as illustrated in FIG. 6.

It is important to avoid sample contamination due to sample material from one receptacle 104 falling into another receptacle 104 while the receptacles 104 are transferred to or from the receptacle storage areas 216, 218 within the input station 106*a* by a sample receptacle handling system 130*a*.

In addition, to maximize the storage capacity of the input station 106*a* (or other receptacle storage module) while minimizing its footprint, the receptacle holding positions 236 are situated as closely as possible to each other, with a space between adjacent receptacle holding positions 236 that is preferably less than the width (or diameter) of the narrowest sample receptacle held in the input station 106*a*. Accordingly, as sample receptacles are transferred from the input station 106*a* to the main conveyor line 184 or branch line 182*a* of conveyor track 119, it is unavoidable that at least some of the sample receptacles will pass over receptacle holding positions between the receptacle holding position from which the receptacle was removed and the conveyor track. Ideally, the sample receptacles do not have to pass over other sample receptacles, thereby avoiding a potential cause of contamination and lowering the height that a receptacle must be raised during transfer to the conveyor track 119.

Accordingly, in an embodiment, the sample receptacle handling system 130*a* is controlled, e.g., by the input station controller 105*a*, to move each sample receptacle 104 from a respective receptacle holding position 236 of each receptacle holding area 216, 218, or of each receptacle rack, in such a manner that the receptacle being transferred does not pass over any other sample receptacle and preferably passes directly from the respective receptacle holding position 236 over the first side 204 of the first receptacle storage area 216 or over the first side 208 of the second receptacle storage area 218 without passing over the third side 212 or fourth side 214 of the first or second receptacle storage areas 216, 218. If the sample receptacle 104 were moved over the third side 212 or fourth side 214 of the storage area 216 or 218 on its way to the conveyor track 119, rather than being moved directly over the first side 204 of the first receptacle storage area 216 or over the first side 208 of the second receptacle storage area 218, the input station 106*a* would have to be widened, or a space would have to be provided between the input station 106*a* and an adjacent station (e.g., output station 106*b*), to accommodate receptacle movement along the third or fourth side.

Figure 7:
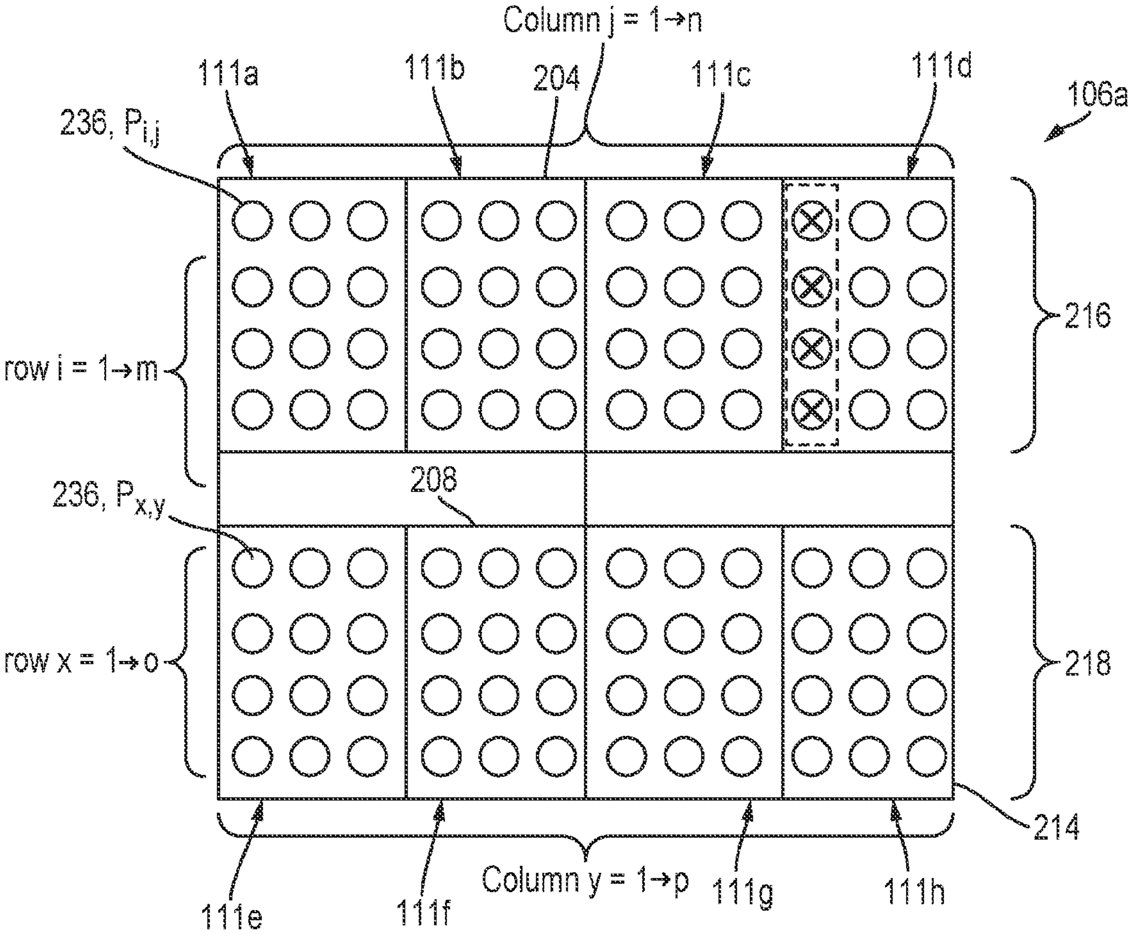
FIG. 7 is a schematic illustration of the exemplary input station showing a numbering scheme for sample receptacle holding positions.

FIG. 7 illustrates receptacle holding position naming conventions for describing a receptacle transfer algorithm controlling the transfer of sample receptacles 104 from respective receptacle holding positions 236 of the first receptacle storage area 216, or from each receptacle rack 111*a*, 111*b*, 111*c*, 111*d* of the first receptacle storage area 216, or from respective receptacle holding positions 236 of the second receptacle storage area 218, or from each receptacle rack 111*e*, 111*f*, 111*g*, 111*h* of the second receptacle storage area 218, to receptacle holders 118 on the conveyor track 119. Each individual receptacle holding position of the first receptacle storage area 216 is designated $P_{i,j}$, being a receptacle holding position 236 at row i (where i=1−m) and column j (where j=1−n). If a portion of the first receptacle storage area 216, such as rack 111*d*, is designated as a quarantine section 230, then sample receptacles are not transferred from the quarantine section 230 to conveyor track 119. Each individual receptacle holding position of second receptacle storage area 218 is designated $P_{x,y}$, being a receptacle holding position 236 at row x (where x=1−o, and o may or may not be equal to m) and column y (where y=1−p, and p may or may not be equal to n).

To ensure that each sample receptacle 104 is transferred from its respective receptacle holding position 236 over the first side 204 of the first receptacle storage area 216 or over the first side 208 of the second receptacle storage area 218 without passing over any sample receptacles 104 held in receptacle holding positions 236 between the respective receptacle holding position and the first side 204 or first side 208, it is necessary that the sample receptacles 104 be removed from the receptacle storage area 216, 218 in a defined sequence so that the sample receptacle 104 will have been previously removed from any sample receptacle holding position 236 over which a transferred sample receptacle 104 must pass. That is, sample receptacle handling system 130*a* is configured and controlled to transfer sample receptacles 104 from receptacle holding positions 236 to the conveyor track 119 such that the order in which the sample receptacles 104 are removed and the path over which each sample receptacle 104 passes is such that the sample receptacle 104 will only pass over receptacle holding positions 236 from which sample receptacles 104 have been previously removed or which were not loaded with a sample receptacle 104 when the storage area was initially loaded (e.g., when a rack that is not fully loaded with sample receptacles is placed in the storage module.

The sample receptacle handling system 130*a* may not be configured to detect the presence or absence of sample receptacles 104, other than being able to detect whether a sample receptacle is disposed between the opposed gripper segments 132*a*, 132*b* of the gripper fingers 131*a*, 131*b* of the gripper 131. Accordingly, it is necessary that the mechanical gripper 131 of the sample receptacle handling system 130*a* be moved by the mover 250 according to a defined path for each receptacle holding station $P_{i,j}$ and $P_{x,y}$ as defined by the receptacle transfer algorithm.

In one example, sample receptacles 104 are transferred row by row, starting with the row of first receptacle storage area 216 that is closest to its first side 204 or starting with the row of the second receptacle storage area 218 that is closest to its first side 208, with each row of sample receptacle holding positions 236 being emptied before proceeding to transfer sample receptacles 104 from the next row.

Using the designations described above, sample receptacles 104 are transferred from the first receptacle storage area 216, or each rack 111*a*, 111*b*, 111*c*, 111*d* (unless rack 111*d* is designated as a quarantine rack) of the first receptacle storage area 216, in the following order: $P_{1,1}$, $P_{1,2}$, $P_{1,3}$, . . . , $P_{1,n}$, $P_{2,1}$, $P_{2,2}$, $P_{2,3}$, . . . , $P_{2,n}$, . . . , $P_{m,1}$, $P_{m,2}$, $P_{m,3}$, . . . , $P_{m,n}$. Each sample receptacle 104 may be transported from its respective receptacle holding position 236 in the Y-direction along the column in which the sample receptacle was stored. That is, each sample receptacle 104 stored at a position $P_{i,j}$ is transported from position $P_{i,j}$ along column j to the first side 204 of the first storage area 216.

Similarly, sample receptacles 104 are transferred from the second receptacle storage area 218, or each rack 111*e*, 111*f*, 111*g*, 111*h* of the second receptacle storage area 218, in the following order: $P_{1,1}$, $P_{1,2}$, $P_{1,3}$, . . . , $P_{1,p}$, $P_{2,1}$, $P_{2,2}$, $P_{2,3}$, . . . , $P_{2,p}$, . . . , $P_{o,1}$, $P_{o,2}$, $P_{o,3}$, . . . , $P_{o,p}$. Each sample receptacle 104 may be transported from its respective receptacle holding position 236 in the Y-direction along the column in which the sample receptacle was stored. That is, each sample receptacle 104 stored at a position $P_{x,y}$ is transported from position $P_{x,y}$ along column y to the first side 208 of the second storage area 218.

In another example, sample receptacles 104 are transferred column by column, starting with the sample receptacle holding position 236 in each column that is closest to the first side 204 of the first receptacle storage area 216 or closest to the first side 208 of the second receptacle storage area 218, with each column of sample receptacle holding positions 236 being emptied before proceeding to transfer sample receptacles 104 from the next column. Using the designations described above, sample receptacles are transferred from the first receptacle storage area 216, or each rack 111*a*, 111*b*, 111*c*, 111*d* (unless rack 111*d* is designated as a quarantine rack) of the first receptacle storage area 216, in the following order: $P_{1,1}$, $P_{2,1}$, $P_{3,1}$, . . . , $P_{m,1}$, $P_{1,2}$, $P_{2,2}$, $P_{3,2}$, . . . , $P_{m,2}$, . . . , $P_{1,n}$, $P_{2,n}$, $P_{3,n}$, . . . , $P_{m,n}$. Each sample receptacle 104 may be transported from its respective receptacle holding position 236 in the Y-direction along the column in which the sample receptacle was stored. That is, each sample receptacle 104 stored at a position Pi,j is transported from position Pi,j along column j to the first side 204 of the first storage area 216.

Similarly, sample receptacles 104 are transferred from the second receptacle storage area 218, or each rack 111*e*, 111*f*, 111*g*, 111*h* of the second receptacle storage area 218, in the following order: $P_{1,1}$, $P_{2,1}$, $P_{3,1}$, . . . , $P_{o,1}$, $P_{1,2}$, $P_{2,2}$, $P_{3,2}$, . . . , $P_{o,2}$, . . . , $P_{1,p}$, $P_{2,p}$, $P_{3,p}$, . . . , $P_{o,p}$. Each sample receptacle 104 may be transported from its respective receptacle holding position 236 in the Y-direction along the column in which the sample receptacle was stored. That is, each sample receptacle 104 stored at a position $P_{x,y}$ is transported from position $P_{x,y}$ along column y to the first side 208 of the second storage area 218.

Figure 8:
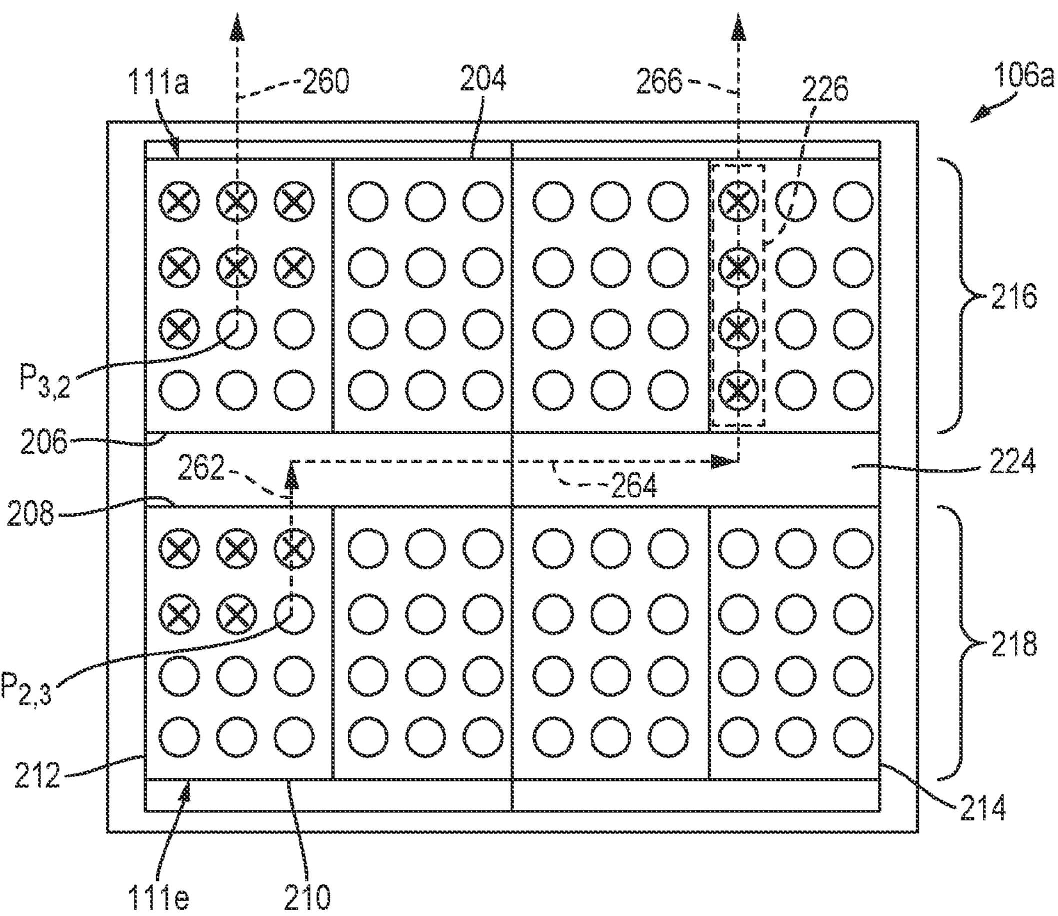
FIG. 8 is a schematic illustration of the exemplary input station showing exemplary pathways for transferring sample receptacles from sample receptacle holding positions within the input station to locations outside the input station.

FIG. 8 illustrates exemplary pathways for transferring a sample receptacle from the first receptacle storage area 216 to the conveyor track 119 (main conveyor line 184 or branch line 182*a*) and for transferring a sample receptacle from the second receptacle storage area 218 to the conveyor track 119. Although FIG. 8 includes reference number 106*a*, which corresponds to the input station, the pathways illustrated in FIG. 8 may be implemented in any receptacle storage module in which the receptacle transfer algorithm and mechanisms described herein may be implemented, including the storage station 106*h* and the output station 106*b*. Dashed arrow 260 represents a pathway from a receptacle holding position within receptacle rack 111*a* at the third row, second column ($P_{3,2}$) past the first side 204 of the first receptacle holding area 216. In the illustrated embodiment, first receptacle storage area 216 is emptied one row at a time, and each of the receptacle holding positions of the first two rows of rack 111*a* and the first receptacle holding position of the third row of rack 111*a* is empty, as illustrated by the "X" across the circle representing each receptacle holding position, exemplifying a process by which the sample receptacles 104 of each rack are transferred row by row, starting with the row closest to the first side 204, and, within each row, starting at the column closest to the third side 212. Any sample receptacle moved from its respective receptacle holding position over the first side 204 of the first receptacle storage area 216 to the track 119, other the first row of receptacle holding positions of the first receptacle storage area (i.e., the row i=1 that is closest to the first side 204 of the first receptacle storage area), will have to pass over one or more other receptacle holding potions, referred to herein as intervening receptacle holding potions. To avoid having to pass over another sample receptacle, the sample receptacle of each intervening receptacle holding position between the respective receptacle holding position and the first side of the first receptacle storage area will have to be removed before another sample receptacle passes over the receptacle holding position.

Dashed arrow 262 represents a pathway from a receptacle holding position within receptacle rack 111*e* at the second row, third column ($P_{2,3}$) past the front side 208 of the second receptacle holding area 218. In the illustrated embodiment, second receptacle storage area 218 is emptied one row at a time, and each ach of the receptacle holding positions of the first row of rack 111*e* and the first two receptacle holding positions of the second row of rack 111*e* is empty, as illustrated by the "X" across the circle representing each receptacle holding position, exemplifying a process by which the sample receptacles 104 of each rack are transferred row by row, starting with the row closest to the front side 208, and, within each row, starting at the column closest to the third side 212. Any sample receptacle moved from its respective receptacle holding position over the first side 208 of the second receptacle storage area 218 to the first receptacle transport path 224, other the first row of receptacle holding positions of the second receptacle storage area (i.e., the row x=1 that is closest to the first side 208 of the second receptacle storage area), will have to pass over one or more other receptacle holding potions between the respective receptacle holding position and the first side of the second receptacle storage area, referred to herein as intervening receptacle holding potions. To avoid having to pass over another sample receptacle, the sample receptacle of each intervening receptacle holding position will have to be removed before another sample receptacle passes over the receptacle holding position.

As represented by dashed arrow 264 in FIG. 8, after the sample receptacle 104 is moved from a receptacle holding station 236 of the second receptacle storage area 218, e.g., receptacle holding station $P_{2,3}$, the sample receptacle is moved along the first receptacle transport path 224 by the sample receptacle handling system 130*a* until the sample receptacle is aligned with the second receptacle transport path 226. The movement represented by arrow 264 is unnecessary if the sample receptacle is being transferred from a receptacle holding station within a column of the second receptacle storage arear 218 that is already aligned with the second receptacle transport path 226. As represented by dashed arrow 266 in FIG. 8, the sample receptacle is moved along the second receptacle transport path 226 by the sample receptacle handling system 130*a* from the second side 206 of the first receptacle storage area 216 past the first side 204 of the first receptacle storage area 216 and to the conveyor track 119. Because the sample receptacle 104 is moved over the first receptacle storage area 216 via the second receptacle transport path 226, it is not necessary that sample receptacles 104 be removed from the first receptacle storage area 216 before sample receptacles are removed from the second receptacle storage area 218. Accordingly, whether the first receptacle storage area 216 or the second receptacle storage area 218 is emptied first is not critical.

If the input station 106*a* includes a STAT section, for example, a section of the first receptacle storage area 216, such as receptacle rack 111*a*, the sample receptacle handling system 130*a* may be controlled to remove all sample receptacles 104 from the STAT section before removing sample receptacles 104 from any other section or rack of the input station 106*a* (i.e., non-STAT sample receptacles). Accordingly, all sample receptacles 104 would be transferred from the STAT section out of the input station 106*a* before any other non-STAT sample receptacles 104 are transferred out of the input station 106*a* from the remainder of first receptacle storage area 216 or before any additional non-STAT sample receptacles are transferred out of the input station 106*a* from second receptacle storage area 218.

Input station 106*a* may be configured so that sample receptacles 104 can be added to portions of the first receptacle storage area 216 or the second receptacle storage area 218 while sample receptacles are being transferred out of the input station 106*a* from other portions of the receptacle storage areas by the sample receptacle handling system 130*a*. For example, as described above, and shown in FIG. 4, racks 111*a* and 111*b* of the first receptacle storage area 216 and racks 111*e* and 111*f* of the second receptacle storage area 218 may be supported on a first drawer 232, and receptacle racks 111*c* and 111*d* of the first receptacle storage area 216 and receptacle racks 111*g* and 111*h* of the second receptacle storage area 218 may be supported on a second drawer 234. First drawer 232 could be opened and one or more of its receptacle racks replaced with receptacle racks holding new sample receptacles 104 while the sample receptacles 104 of the second drawer 234 are being transferred out of the input station 106*a* by the sample receptacle handling system 130*a*. In addition, second drawer 234 could be opened and one or more of its receptacle racks replaced with receptacle racks holding new sample receptacles 104 while the sample receptacles 104 of the first receptacle storage area 216 within first drawer 232 are being transferred out of the input station 106*a* by the sample receptacle handling system 130*a*.

Thus, after all sample receptacles 104 of the STAT section 228 (e.g., rack 111*a*) are transferred out of the input station 106*a*, and while non-STAT sample receptacles 104 from another section of the second receptacle storage area 218 are being transferred out of the input station 106*a* by the sample receptacle handling system 130*a*, it is possible that additional sample receptacles may be added to the STAT section 228 before all sample receptacles are transferred out of the input station 106*a* from other, non-STAT sections of the second receptacle storage area 218. If new sample receptacles 104 are added to a STAT section of the input station 106*a* while sample receptacles are being transferred out of a non-STAT section of the input station 106*a*, the sample receptacle handling system 130*a* may be controlled to transfer the sample receptacles newly added to the STAT section out of the input station 106*a* before resuming transfer of sample receptacles from the other, non-STAT sections of the input station 106*a*. For example, assume sample receptacle rack 111*a* is a STAT receptacle rack. After rack 111*a* is initially emptied by the sample receptacle handling system 130*a*, drawer 232 may be opened and new sample receptacles added to rack 111*a*, or rack 111*a* may be replaced with a rack containing additional sample receptacles 104, while sample receptacles 104 are being transferred out of the input station 106*a* from one of the receptacle racks of the drawer 234. In this case, after drawer 232 is closed, the sample receptacle handling system 130*a* may be controlled to transfer sample receptacles from the receptacle rack 111*a* out of the input station 106 before transferring any other non-STAT sample receptacles out of the input station 106*a*.

In an embodiment, input station 106*a* may include a switch (e.g., mechanical, optical, magnetic) or other means that is actuated when the STAT sample rack 111*a* is removed and replaced with a new rack, thereby providing a signal for the controller, e.g. controller 105*a*, to stop transferring sample receptacles from a different section of the input station 106*a* and to first transfer sample receptacles out of the input station 106*a* from the just-replaced STAT rack 111*a*. In an embodiment, the controller will remember where it left off and will return to that different section after transferring the sample receptacles newly added to the STAT rack 111*a*.

As noted, the sample receptacle handling system 130*a* may not be able to detect the presence of a sample receptacle within a receptacle holdings station 236 other than being able to detect whether a sample receptacle 104 is disposed between the gripper segments 132*a*, 132*b* of the gripper fingers 131*a*, 131*b* of the mechanical gripper 131. Accordingly, in one embodiment, controller 105*a* is programmed to actuate the gripper mover 250 of the sample receptacle handling system 130*a* to position the mechanical gripper 131 at the first receptacle holding position of the STAT section (e.g., first row and first column of the STAT 228 section, $P_{1,1}$). The mechanical gripper 131 is then actuated to attempt to grip a sample receptacle 104 at the first receptacle holding position—e.g., by positioning the gripper fingers 131*a*, 131*b* in an open configuration with the gripper segments 132*a*, 132*b* positioned adjacent opposed sides of an upper portion of the sample receptacle projecting above the first receptacle holding position and then closing the opposed gripper fingers to grip the opposed sides of the sample receptacle between the gripper segments 132*a*, 132*b*. The controller 105*a* may be programmed to determine there is no sample receptacle at that receptacle holding position if the opposed gripper fingers 131*a*, 131*b* of the mechanical gripper 131 close to positions in which the gripper surfaces 133 of the gripper segments 132*a*, 132*b* are spaced apart by a distance that is less than the width of the narrowest sample receptacle held in the input station 106*a*. If the controller determines there is no sample receptacle 104 at that sample receptacle positon, the controller 105*a* then actuates the gripper mover 250 to position the mechanical gripper 131 at the second receptacle holding position of the STAT section (e.g., first row and second column of the STAT section, $P_{1,2}$). The mechanical gripper 131 is then actuated to attempt to pick up a sample receptacle at the second receptacle holding position, as described above, and if no sample receptacle is located at the second receptacle holding position, the controller 105*a* then actuates the gripper mover 250 to position the mechanical gripper 131 at the third receptacle holding position of the STAT section (e.g., first row and third column of the STAT section, $P_{1,3}$). This process of attempting to grasp a sample receptacle at successive receptacle holding positions is repeated a prescribed number of times (e.g., 1, 2, 3, 4, 5, 6, 7, 8, 9, 10, or more times), and if no sample receptacles are detected at the prescribed number of consecutive receptacle holding positions, the controller is programmed to actuate the sample receptacle handling system to attempt to pick up sample receptacles at a different receptacle storage area or at a different receptacle rack.

On the other hand, if a sample receptacle 104 is gripped by the mechanical gripper 131, the gripped sample receptacle is removed from the respective receptacle holding position and transferred from the receptacle holding position 236 to the receptacle holder 118 on the main conveyor line 184 or branch line 182*a* of conveyor track 119. After the sample receptacle is successfully transferred out of the input station 106*a*, the controller 105*a* then actuates the gripper mover 250 to position the mechanical gripper 131 at the next receptacle holding position (e.g., same row, next column or next row, same column of the STAT section).

Using the fluid level measuring system 144, the input station controller 105*a* is further configured to determine if the relative fluid level for a sample receptacle 104 is outside of a predetermined range or above a predetermined set level. The term "above" in this context means that the level of the fluid within the sample receptacle 104 is higher than a predetermined, programmed, or otherwise set level. Furthermore, the input station controller 105*a*, input station 106*a*, and/or automated analysis system 100, may be configured to quarantine a sample receptacle 104 if the relative fluid level for the sample receptacle 104 is determined to be outside of a predetermined range or above a predetermined level. As described above, input station 106*a* may include a portion of the first receptacle storage area 216 comprising a contiguous group of receptacle holding positions 236 that is designated as a quarantine section 230, such as a quarantine rack 111*d*, in which the sample receptacle handling system 130*a* of the input station 106*a* places sample receptacles 104 needing to be quarantined. For instance, in order to reduce the risk of spilling or splashing of fluid sample 102 from a sample receptacle 104, which may contaminate other sample receptacles 104 or components of the system 100 if sample receptacle 104 is uncapped, a predetermined maximum level for the relative fluid level may be set (i.e., a minimum headspace). If the input station controller 105*a* determines, via the fluid level measuring system 144, that the fluid level for a sample receptacle 104 is above the maximum level so that there is insufficient head space in the sample receptacle 104, then the sample receptacle handling system 130*a* retrieves the sample receptacle 104 from a receptacle holder 118 on the conveyor track 119 (main conveyor line 184 or branch line 182*a*) and places the sample receptacle 104 into a receptacle holding position 236 within the quarantine section 230 of the input station 106*a*. In embodiment, the sample receptacle handling system 130*a* is configured to operate at a slower than normal speed when transporting a sample receptacle for which the fluid level is determined to exceed the maximum so as to reduce the likelihood of spillage while the sample receptacle is transported to the quarantine section. Similarly, a predetermined minimum level for the fluid level may be set, for example, to ensure that there is sufficient fluid sample 102 in a sample receptacle 104 for processing on the automated analysis system (e.g., run one or more tests on one or more of the analyzer stations 106*e*). If the input station controller 105*a* determines that the fluid level for a sample receptacle 104 is below the minimum level so that there is insufficient sample material contained within the selected sample receptacle, then the sample receptacle 104 can be moved to the quarantine section 230 in the same manner as the sample receptacle 104 having a fluid level that exceeds the maximum level. The quarantine section 230 (e.g., rack 111*d*), which is initially empty, may be positioned for manual removal from the quarantine area of the input station 106*a*, e.g., when second drawer 234 is open.

If the second receptacle transport path 226 extends across the quarantine section 230, the input station controller 105*a* is programmed to not place any quarantined sample receptacles in any receptacle holding station encompassed by the second receptacle transport path 226.

The input station controller 105*a* may also be configured to release a sample receptacle 104 for processing on the automated analysis system 100 when the relative fluid level is determined to be within a predetermined range or below a predetermined level. For instance, the input station controller 105*a* may be configured to release a sample receptacle if it determines that the relative fluid level is below a predetermined maximum level for the relative fluid level.

The input station controller 105*a* may also be configured to quarantine a sample receptacle if the tilt angle is determined to be outside of a predetermined range of tilt angles or above a predetermined tilt angle. For instance, the input station controller 105*a* may be programmed to quarantine a sample receptacle if the tilt angle is determined to be above 2°, above 5°, or above 10° relative to the central axis of the sample receptacle. An exemplary manner of determining the tilt angle is described in International Application No. PCT/US2021/028719.

The input station controller 105*a* may also be configured to release a sample receptacle if the tilt angle is determined to be within a predetermined range of tilt angles. For instance, the input station controller 105*a* may be programmed to release a sample receptacle 104 if the tilt angle is determined to be less than 2°, less than 5°, or less than 10° (or less than some other prescribed maximum tilt) relative to the central axis of the sample receptacle.

Other reasons a sample receptacle 104 may be transferred from a receptacle holder 118 on the conveyor track 119 to the quarantine area of the input station 106*a* include insufficient information stored in a system database for the selected sample receptacle 104, or inability to read machine readable information on the selected sample receptacle 104. The input station controller 105*a* may also be configured to quarantine a sample receptacle if there are liquid level detection errors while attempting to read the liquid level in the fluid level measuring system 144, if there are read errors while attempting to read a machine-readable label on the receptacle with the reader 137 (e g., missing label, or an unreadable barcode due to a torn or crumpled label), if no patient information is found corresponding to the receptacle label, if there are no open test orders for the identified patient, if the receptacle 104 is not properly seated in the carrier 118, or if, for any reason, the receptacle cannot be processed by any of the analyzer stations 106*e*.

When sample receptacles are automatically transferred from the track 119 to racks or other receptacle storage areas of the output module 106*b* by the sample receptacle handling system 130*b* of the output station 106*b*, sample tubes are also transferred in such a manner that no tube will be transferred over another tube already stored in the output module 106*b*. Using the conventions illustrated in FIG. 4 for the input station 106*a*, the side of the output station 106*b* that is closest to the track 119 (main conveyor line 184 or branch line 182*b*) is the back of the output station 106*b*, and the side of the output station 106*b* that is furthest from the track 119 is the front of the output station 106*b*. To avoid having sample receptacles pass over other sample receptacles, the sample receptacle handling system 130*b* is controlled by the output station controller 105*b* to first fill sample receptacle holding positions closest to the front of the output station 106*b* and then fill sample receptacle holding positions located progressively farther from the front of the output station 106*b*.

Systems and algorithms described herein improve the operation and efficiency of a receptacle storage module, such as the input station 106*a*, from which receptacles are automatically transferred to an automated conveyor system of an automated analysis system by limiting the vertical and horizontal footprint of the storage module, thereby saving space, while reducing the risks of cross-contamination between receptacles and allowing more flexibility in the order in which sample receptacles are transferred from different areas of the receptacle storage module. To save space horizontally, while maximizing storage capacity, receptacle holding positions are situated in close proximity to each other, with spacing between the positions being less than the width, or diameter, of the individual receptacles, and receptacles are transferred out of the receptacle storage module to the automatic conveyor system by a receptacle handling system through or past a side of the receptacle storage module that is closest in proximity to the automated conveyor system, rather than through or past lateral sides of the receptacle storage module. To save space vertically and to reduce cross contamination risks, sample receptacles are transferred out of the receptacle storage module to the automatic conveyor system by a receptacle handling system without passing over other receptacles held in the receptacle storage structure. This reduces the risk that sample material may spill from a sampler receptacle being transferred into another sample receptacle because the sample receptacle being transferred does not pass over other sample receptacles. This also limits the height to which the transferred receptacle must be lifted while being transferred because it does not have to be lifted over other receptacles. By providing a first receptacle transport path between first and second storage areas and a second receptacle transport path through the first receptacle storage area, sample receptacles may be transferred from either the first or second storage areas to the automated conveyor system, and whether sample receptacles are transferred from the first or second receptacle storage area first is not critical.

EXEMPLARY EMBODIMENTS

Embodiment 1. A system for storing a plurality of sample receptacles and for transferring each sample receptacle out of the system without passing over another sample receptacle stored in the system, the system comprising: a first receptacle storage area, wherein the first receptacle storage area has opposed first and second sides and opposed third and fourth sides oriented transversely to the first and second sides and includes a plurality of receptacle holding positions, wherein each receptacle holding position is configured to hold a single sample receptacle and is spaced apart from any directly adjacent receptacle holding position by a distance that is less than the width of the narrowest receptacle holding position, wherein the plurality of receptacle holding positions are arranged in a series of parallel rows oriented in a first direction extending from the third side of the first receptacle storage area to the fourth side of the first receptacle storage area and a series of parallel columns oriented in a second direction extending from the first side of the first receptacle storage area to the second side of the first receptacle storage area; and a second receptacle storage area, wherein the second receptacle storage areas has opposed first and second sides and opposed third and fourth sides oriented transversely to the first and second sides and includes a plurality of receptacle holding positions, wherein each receptacle holding position is configured to hold a single sample receptacle and is spaced apart from any directly adjacent receptacle holding position by a distance that is less than the width of the narrowest receptacle holding position, wherein the plurality of receptacle holding positions are arranged in a series of parallel rows oriented in a first direction extending from the third side of the second receptacle storage area to the fourth side of the second receptacle storage area and a series of parallel columns oriented in a second direction extending from the first side of the second receptacle storage area to the second side of the second receptacle storage area, wherein the first and second receptacle storage areas are arranged with the first side of the second receptacle storage area facing the second side of the first receptacle storage area, and wherein the second side of the first receptacle storage area is spaced apart from the first side of the second receptacle storage area by a distance of not less than the width of the widest receptacle holding position of the second receptacle storage area, thereby defining a first receptacle transport path between the first and second receptacle storage areas, and wherein the first receptacle storage area includes a second receptacle transport path extending from the first side of the first receptacle storage area to the second side of the first receptacle storage area, wherein the second receptacle transport path has a width of not less than the width of the widest receptacle holding position of the second receptacle storage area; a conveyor configured to transport the sample receptacles; a sample receptacle handling system configured to transfer sample receptacles held in the first and second receptacle storage areas from their respective receptacle holding positions to the conveyor; and a controller in communication with the sample receptacle handling system and programmed to: transfer sample receptacles from the first receptacle storage area to receptacle holders supported on the conveyor by moving each sample receptacle with the sample receptacle handling system from a respective receptacle holding position of the first receptacle storage area, over the first side of the first receptacle storage area, and to the conveyor without passing over another sample receptacle held in a receptacle holding position within the first receptacle storage area; and transfer sample receptacles from the second receptacle storage area to the conveyer by: moving each sample receptacle with the sample receptacle handling system from a respective receptacle holding position of the second receptacle storage area, over the first side of the second receptacle storage area, and into the first receptacle transport path without passing over another sample receptacle held in a receptacle holding position within the second receptacle storage area; after the removed sample receptacle is transferred from the respective receptacle holding position of the second receptacle storage area into the first receptacle transport path, moving the sample receptacle with the sample receptacle handling system for a distance necessary to align the removed sample receptacle with the second receptacle transport path; and then moving the removed sample receptacle with the sample receptacle handling system along the second receptacle transport path from the second side of the first receptacle storage area over the first side of the first receptacle storage area and to the conveyor.

Embodiment 2. The system of embodiment 1, wherein the second receptacle transport path comprises a column of empty receptacle holding positions of the first receptacle storage area.

Embodiment 3. The system of embodiment 1 or 2, wherein the controller is programmed to move each sample receptacle with the sample receptacle handling system from a respective receptacle holding position of the first receptacle storage area, over the first side of the first receptacle storage area, and to the conveyor without passing over another sample receptacle held in a receptacle holding position within the first receptacle storage area by moving any sample receptacle from a respective receptacle holding position of the first receptacle storage area, other than a receptacle held in a respective receptacle holding position located in the row that is closest to the first side of the first receptacle storage area, over each of one or more intervening receptacle holding positions located between the respective receptacle holding position and the first side of the first receptacle storage area, and wherein sample receptacles will have been previously removed from the one or more intervening receptacle holding positions.

Embodiment 4. The system of any one of embodiments 1-3, wherein the controller is programmed to move each sample receptacle with the sample receptacle handling system from a respective receptacle holding position of the second receptacle storage area, over the first side of the second receptacle storage area, and into the first receptacle transport path without passing over another sample receptacle held in a receptacle holding position within the second receptacle storage area by moving any sample receptacle from a respective receptacle holding position of the second receptacle storage area, other than a receptacle held in a respective receptacle holding position located in the row that is closest to the first side of the second receptacle storage area, over each of one or more intervening receptacle holding positions located between the respective receptacle holding position and the first side of the second receptacle storage area, and wherein sample receptacles will have been previously removed the one or more intervening receptacle holding positions.

Embodiment 5. The system of any one of embodiments 1-4, wherein a pathway over which each sample receptacle is moved with the sample receptacle handling system from the respective receptacle holding position of the first receptacle storage area over the first side of the first receptacle storage area is programmed into the controller for each receptacle holding position of the first receptacle storage area, and a pathway over which each sample receptacle is moved with the sample receptacle handling system from the respective receptacle holding position of the second receptacle storage area over the first side of the second receptacle storage area and into the first receptacle transport path is programmed into the controller for each receptacle holding position of the second receptacle storage area.

Embodiment 6. The system of any one of embodiments 1-5, wherein the sample receptacle handling system comprises: a mechanized robot including a mechanical gripper configured to grip an individual sample receptacle within a receptacle holding position; and a gripper mover configured to effect movement of the gripper in a vertical direction and orthogonal horizontal directions.

Embodiment 7. The system of embodiment 6, wherein the controller is programmed to: cause the sample receptacle handling system to remove sample receptacles from respective receptacle holding positions by attempting to grip a sample receptacle at the respective receptacle holding position with the mechanical gripper and to detect whether or not a sample receptacle is held at the respective receptacle holding position; and if no sample receptacle is detected at the respective receptacle holding position, to advance the mechanical gripper to a next receptacle holding position within the same row of receptacle holding positions, within the same column of receptacle holding positions, within a next row of receptacle holding positions, or within a next column of receptacle holding positions.

Embodiment 8. The system of embodiment 7, wherein each of the first and second receptacle storage areas comprise two or more receptacle racks removably supported on a rack supporting platform, and each receptacle rack includes a plurality of receptacle holding positions arranged in rows and columns, and wherein the controller is programmed to advance the mechanical gripper to a next receptacle holding position within the next rack of the first or second storage area if no sample receptacle is detected at a prescribed number of consecutive respective receptacle holding positions.

Embodiment 9. The system of any one of embodiments 1-8, wherein a portion of the first receptacle storage area comprising a contiguous group of receptacle holding positions is designated as a STAT section for holding STAT sample receptacles, and wherein the controller is programmed to first transfer all sample receptacles held in respective receptacle holding positions within the STAT section of the first receptacle storage area to the conveyer with the sample receptacle handling system before transferring sample receptacles held in remaining receptacle holding positions within the first receptacle storage area and before transferring sample receptacles held in receptacle holding positions within the second receptacle storage area.

Embodiment 10. The system of embodiment 9, wherein the controller is programmed so that, if, after all sample receptacles are removed from the STAT section of the first receptacle storage area with the sample receptacle handling system, additional sample receptacles are placed in receptacle holding positions of the STAT section while sample receptacles are being removed from remaining receptacle holding positions of the first receptacle storage area with the sample receptacle handling system or while sample receptacles are being removed from receptacle holding positions of the second receptacle storage area with the sample receptacle handling system, the removal of sample receptacles from the first or second receptacle storage areas is interrupted, and the additional sample receptacles placed in the STAT section are removed with the sample receptacle handling system before resuming removal of sample receptacles from the first or second receptacle storage areas with the sample receptacle handling system.

Embodiment 11. The system of any one of embodiments 1-6, wherein a portion of the second receptacle storage area comprising a contiguous group of receptacle holding positions is designated as a STAT section for holding STAT sample receptacles, and wherein the controller is programmed to first transfer all sample receptacles held in respective receptacle holding positions within the STAT section of the second receptacle storage area to the conveyer with the sample receptacle handling system before transferring sample receptacles held in remaining receptacle holding positions within the second receptacle storage area and before transferring sample receptacles held in receptacle holding positions within the first receptacle storage area.

Embodiment 12. The system of embodiment 11, wherein the controller is programmed so that, if, after all sample receptacles are removed from the STAT section of the second receptacle storage area with the sample receptacle handling system, additional sample receptacles are placed in receptacle holding positions of the STAT section while sample receptacles are being removed from remaining receptacle holding positions of the second receptacle storage area with the sample receptacle handling system or while sample receptacles are being removed from receptacle holding positions of the first receptacle storage area with the sample receptacle handling system, the removal of sample receptacles from the second or first receptacle storage areas is interrupted and the additional sample receptacles placed in the STAT section are removed with the sample receptacle handling system before resuming removal of sample receptacles from the second or first receptacle storage areas with the sample receptacle handling system.

Embodiment 13. The system of any one of embodiments 1-12, wherein the controller is programmed to control the sample receptacle handling system to remove sample receptacles from at least a portion of each row of receptacle holding positions of the first receptacle storage area, one row at a time, starting with the row that is closest to the first side of the first receptacle storage area, and to then remove sample receptacles from rows progressively farther from the first side of the first receptacle storage area.

Embodiment 14. The system of any one of embodiments 1-12, wherein the controller is programmed to control the sample receptacle handling system to remove all sample receptacles from at least a portion of the columns of receptacle holding positions of the first receptacle storage area, one column at a time, starting with the sample receptacle within each column that is closest to the first side of the first receptacle storage area, and to then remove each sample receptacle from that column that is progressively farther from the first side of the first receptacle storage area.

Embodiment 15. The system of embodiment 14, wherein the controller is programmed to control the sample receptacle handling system to remove the sample receptacles from at least a portion of the columns of receptacle holding positions of the first receptacle storage area, one column at a time, starting with the column that is closest to the third side of the first receptacle storage area, and to then remove sample receptacles from columns progressively farther from the third side of the first receptacle storage area.

Embodiment 16. The system of any one of embodiments 1-15, wherein the controller is programmed to control the sample receptacle handling system to remove all sample receptacles from each row of receptacle holding positions of the second receptacle storage area, one row at a time, starting with the row that is closest to the first side of the second receptacle storage area, and to then remove sample receptacles from rows progressively farther from the first side of the second receptacle storage area.

Embodiment 17. The system of any one of embodiments 1-15, wherein the controller is programmed to control the sample receptacle handling system to remove all sample receptacles from each column of receptacle holding positions of the second receptacle storage area, one column at a time, starting with the sample receptacle within each column that is closest to the first side of the second receptacle storage area, and to then remove each sample receptacle from that column that is progressively farther from the first side of the second receptacle storage area.

Embodiment 18. The system of embodiment 17, wherein the controller is programmed to control the sample receptacle handling system to remove the sample receptacles from each column of receptacle holding positions of the second receptacle storage area, one column at a time, starting with the column that is closest to the third side of the second receptacle storage area, and to then remove sample receptacles from columns progressively farther from the third side of the second receptacle storage area.

Embodiment 19. The system of any one of embodiments 1-7, wherein each of the first and second receptacle storage areas comprises two or more receptacle racks removably supported on a rack supporting platform, and each receptacle rack includes a plurality of receptacle holding positions arranged in rows and columns.

Embodiment 20. The system of any one of embodiments 1-6, wherein each of the first and second receptacle storage areas comprise two or more receptacle racks removably supported on a rack supporting platform, and each receptacle rack includes a plurality of receptacle holding positions arranged in rows and columns, wherein one rack of the first receptacle storage area is designated as a STAT rack for holding STAT sample receptacles, and wherein the controller is programmed to first transfer all sample receptacles from respective receptacle holding positions within the STAT rack to the conveyer with the sample receptacle handling system and before transferring sample receptacles from remaining receptacle holding positions within the first receptacle storage area and before transferring sample receptacles from receptacle holding positions within the second receptacle storage area.

Embodiment 21. The system of embodiment 20, wherein the controller is programmed such that, if, after all sample receptacles are removed from the STAT rack with the sample receptacle handling system, additional sample receptacles are placed in one or more receptacle holding positions of the STAT rack before all sample receptacles are removed from racks, other than the STAT rack, of the first receptacle storage area and/or the second receptacle storage area, the sample receptacle handling system is returned to the STAT rack to remove all sample receptacles held by the STAT rack before removing sample receptacles from racks, other than the STAT rack, of the first receptacle storage area and the second receptacle storage area.

Embodiment 22. The system of embodiment 20 or 21, further comprising a switch configured to generate a signal detected by the controller when the STAT rack has been replaced and wherein the controller is programmed to transfer all sample receptacles from respective receptacle holding positions within the replaced STAT rack with the sample receptacle handling system before transferring sample receptacles from remaining receptacle holding positions within the first receptacle storage area and before transferring sample receptacles from receptacle holding positions within the second receptacle storage area.

Embodiment 23. The system of any one of embodiments 19-22, wherein the racks of the first receptacle storage area are separated from the racks of the second receptacle storage area by a gap forming the first receptacle transport path.

Embodiment 24. The system of any one of embodiments 19-23, further comprising: a first drawer supporting at least one rack of the first receptacle storage area and at least one rack of the second receptacle storage area; and a second drawer supporting at least one rack of the first receptacle storage area and at least one rack of the second receptacle storage.

Embodiment 25. The system of any one of embodiments 19-23, wherein the first receptacle storage area comprises four receptacle racks arranged side-by-side between the third and fourth sides of the first receptacle storage area, and wherein the four receptacle racks of the first receptacle storage area have aligned first sides corresponding to the first side of the first receptacle storage area and aligned second sides corresponding to the second side of the first receptacle storage area, and wherein the second receptacle storage area comprises four receptacle racks arranged side-by-side between the third and fourth sides of the second receptacle storage area, and wherein the four receptacle racks of the second receptacle storage area have aligned first sides corresponding to the first side of the second receptacle storage area and aligned second sides corresponding to the second side of the second receptacle storage area.

Embodiment 26. The system of embodiment 25, wherein the second receptacle transport path comprises a gap between two of the four receptacle racks of the first receptacle storage area, and wherein the gap has a width of not less than the width of the widest receptacle holding position of the second receptacle storage area.

Embodiment 27. The system of embodiment 25 or 26, further comprising: a first drawer supporting two receptacle racks of the first receptacle storage area and two receptacle racks of the second receptacle storage area; and a second drawer supporting two receptacle racks of the first receptacle storage area and two receptacle racks of the second receptacle storage area.

Embodiment 28. The system of any one of embodiments 1-27, wherein a portion of the first receptacle storage area comprising a contiguous group of receptacle holding positions is designated as a quarantine section configured to receive sample receptacles placed therein by the sample receptacle handling system, and wherein the controller is programmed to transfer selected ones of the sample receptacles from receptacle holding positions of the first or second receptacle storage area that are not within the quarantine section out of the first or second receptacle storage area, as applicable, and to then transfer the selected sample receptacles to receptacle holding positions of the quarantine section.

Embodiment 29. The system of embodiment 28, wherein the controller is programmed to transfer selected sample receptacles to the quarantine section upon the occurrence of an error with respect to the selected sample receptacle.

Embodiment 30. The system of embodiment 29, wherein the error with respect to the selected sample receptacle comprises one or more of: insufficient information is stored relating to the selected sample receptacle, no open test orders are stored for the selected sample receptacle; inability to read machine-readable information associated with the selected sample receptacle; insufficient head space within the selected sample receptacle; and insufficient sample materials contained within the selected sample receptacle.

Embodiment 31. The system of any one of embodiments 1-24, wherein a portion of the first receptacle storage area comprising a contiguous group of receptacle holding positions is designated as a quarantine section configured to receive sample receptacles placed therein by the sample receptacle handling system, wherein the second receptacle transport path comprises a column of empty receptacle holding positions of the quarantine section, and wherein the controller is programmed to transfer selected ones of the sample receptacles from receptacle holding positions of the first or second receptacle storage area that are not within the quarantine section out of the first or second receptacle storage area, as applicable, and to then transfer the selected sample receptacles to receptacle holding positions of the quarantine section other than the receptacle holding positions of the second receptacle transport path.

Embodiment 32. The system of embodiment 31, wherein the controller is programmed to transfer selected sample receptacles to the quarantine section upon the occurrence of an error with respect to the selected sample receptacle.

Embodiment 33. The system of embodiment 32, wherein the error with respect to the selected sample receptacle comprises one or more of: insufficient information is stored relating to the selected sample receptacle; no open test orders are stored for the selected sample receptacle; inability to read machine-readable information associated with the selected sample receptacle; insufficient head space within the selected sample receptacle; and insufficient sample materials contained within the selected sample receptacle.

Embodiment 34. The system of any one of embodiments 1 to 33, wherein each sample receptacle comprises a test tube.

Embodiment 35. The system of any one of embodiments 1 to 34, further comprising a plurality of receptacle holders, each receptacle holder being supported on the conveyor and configured to receive a sample receptacle and hold the sample receptacle in an upright orientation.

Embodiment 36. A method of transferring each of a plurality of sample receptacles from a receptacle storage module to a conveyor situated adjacent to the receptacle storage module, wherein the receptacle storage module includes a first receptacle storage area and a second receptacle storage area, wherein each of the first and second receptacle storage areas has opposed first and second sides and opposed third and fourth sides oriented transversely to the first and second sides, and wherein the first and second receptacle storage areas are arranged with the first side of the second receptacle storage area facing the second side of the first receptacle storage area; wherein the first receptacle storage area includes a plurality of receptacle holding positions arranged in a series of parallel rows oriented in a first direction extending from the third side of the first receptacle storage area to the fourth side of the first receptacle storage area and a series of parallel columns oriented in a second direction extending from the first side of the first receptacle storage area to the second side of the first receptacle storage area, wherein each receptacle holding position of the first receptacle storage area is configured to hold a single sample receptacle and is spaced apart from any directly adjacent receptacle holding position by a distance that is less than the width of the narrowest receptacle holding position; wherein the second receptacle storage area includes a plurality of receptacle holding positions arranged in a series of parallel rows oriented in a first direction extending from the third side of the second receptacle storage area to the fourth side of the second receptacle storage area and a series of parallel columns oriented in a direction extending from the first side of the second receptacle storage area to the second side of the second receptacle storage area, wherein each receptacle holding position of the second receptacle storage area is configured to hold a single sample receptacle and is spaced apart from any directly adjacent receptacle holding position by a distance that is less than the width of the narrowest receptacle holding position; wherein the second side of the first receptacle storage area is spaced apart from the first side of the second receptacle storage area by a distance of not less than the width of the widest receptacle holding position of the second receptacle storage area, thereby defining a first receptacle transport path between the second side of the first receptacle storage area and the first side of the second receptacle storage area, wherein the first receptacle storage area includes a second receptacle transport path extending from the first side of the first receptacle storage area to the second side of the first receptacle storage area, wherein the second receptacle transport path has a width of not less than the width of the widest receptacle holding position of the second receptacle storage area, wherein the method comprises controlling a sample receptacle handling system to: (1) transfer sample receptacles from the first receptacle storage area to the conveyor by moving each sample receptacle with the sample receptacle handling system from a respective receptacle holding position of the first receptacle storage area, over the first side of the first receptacle storage area, and to the conveyor, wherein each of the sample receptacles is removed from the first receptacle storage area in an order and via a pathway over the first side of the first receptacle storage area such that the removed sample receptacle does not pass over another sample receptacle held in a receptacle holding position within the first receptacle storage area; and (2) transfer sample receptacles from the second receptacle storage area to the conveyer by: (a) moving each sample receptacle with the sample receptacle handling system from a respective receptacle holding position of the second receptacle storage area, over the first side of the second receptacle storage area, and into the first receptacle transport path, wherein each of the sample receptacles is removed from the second receptacle storage area in an order and via a pathway over the first side of the second receptacle storage area and into the first receptacle transport path such that the removed sample receptacle does not pass over another sample receptacle held in a receptacle holding position within the second receptacle storage area; (b) after the removed sample receptacle is transferred from the respective receptacle holding position of the second receptacle storage area into the first receptacle transport path, moving the sample receptacle with the sample receptacle handling system for a distance necessary to align the removed sample receptacle with the second receptacle transport path; and (c) then moving the removed sample receptacle with the sample receptacle handling system along the second receptacle transport path from the second side of the first receptacle storage area over the first side of the first receptacle storage area and to the conveyor.

Embodiment 37. The method of embodiment 36, wherein the second receptacle transport path comprises a column of empty receptacle holding positions of the first receptacle storage area.

Embodiment 38. The method of embodiment 36 or 37, wherein step (1) comprises moving any sample receptacle from a respective receptacle holding position of the first receptacle storage area, other than a receptacle held in a respective receptacle holding position located in the row that is closest to the first side of the first receptacle storage area, over each of one or more intervening receptacle holding positions located between the respective receptacle holding position and the first side of the first receptacle storage area, and wherein sample receptacles will have been previously removed from the one or more intervening receptacle holding positions.

Embodiment 39. The method of any one of embodiments 36-38, wherein step (2) (a) comprises moving any sample receptacle from a respective receptacle holding position of the second receptacle storage area, other than a receptacle held in a respective receptacle holding position located in the row that is closest to the first side of the second receptacle storage area, over each of one or more intervening receptacle holding positions located between the respective receptacle holding position and the first side of the second receptacle storage area, and wherein sample receptacles will have been previously removed from the one or more intervening receptacle holding positions.

Embodiment 40. The method of any one of embodiments 36-39, wherein the pathway over which each sample receptacle is moved with the sample receptacle handling system from the respective receptacle holding position of the first receptacle storage area over the first side of the first receptacle storage area is predefined for each receptacle holding position of the first receptacle storage area, and the pathway over which each sample receptacle is moved with the sample receptacle handling system from the respective receptacle holding position of the second receptacle storage area over the first side of the second receptacle storage area and into the first receptacle transport path is predefined for each receptacle holding position of the second receptacle storage area.

Embodiment 41. The method of any one of embodiments 36-40, wherein the sample receptacle handling system comprises a mechanized robot including a mechanical gripper configured to grip an individual sample receptacle within a receptacle holding position and a gripper mover configured to effect movement of the gripper in a vertical direction and orthogonal horizontal directions.

Embodiment 42. The method of embodiment 41, wherein transferring a receptacle from the first receptacle storage area or transferring a receptacle from the second receptacle storage area comprises: controlling the sample receptacle handling system to remove sample receptacles from respective receptacle holding positions of the first receptacle storage area or the second receptacle storage area by attempting to grip a sample receptacle at the respective receptacle holding position with the mechanical gripper and to detect whether or not a sample receptacle is held at the respective receptacle holding position; and if no sample receptacle is detected at the respective receptacle holding position, to advance the mechanical gripper to a next receptacle holding position within the same row of receptacle holding positions, within the same column of receptacle holding positions, within a next row of receptacle holding positions, or within a next column of receptacle holding positions.

Embodiment 43. The method of embodiment 42, wherein each of the first and second receptacle storage areas comprise two or more receptacle racks removably supported on a rack supporting platform, and each receptacle rack includes a plurality of receptacle holding positions arranged in rows and columns, and wherein the method further comprises advancing the mechanical gripper to a next receptacle holding position within the next rack of the first or second storage area if no sample receptacle is detected at a prescribed number of consecutive respective receptacle holding positions.

Embodiment 44. The method of any one of embodiments 36-43, wherein a portion of the first receptacle storage area comprising a contiguous group of receptacle holding positions is designated as a STAT section for holding STAT sample receptacles, and wherein the method comprises first transferring all sample receptacles held in respective receptacle holding positions within the STAT section of the first receptacle storage area to the conveyer with the sample receptacle handling system before transferring sample receptacles held in remaining receptacle holding positions within the first receptacle storage area and before transferring sample receptacles held in receptacle holding positions within the second receptacle storage area.

Embodiment 45. The method of embodiment 44, further comprising, if, after all sample receptacles are removed from the STAT section of the first receptacle storage area with the sample receptacle handling system, additional sample receptacles are placed in receptacle holding positions of the STAT section while sample receptacles are being removed from remaining receptacle holding positions of the first receptacle storage area or while sample receptacles are being removed from receptacle holding positions of the second receptacle storage area, interrupting the removal of sample receptacles from the first or second receptacle storage areas and removing the additional sample receptacle placed in the STAT section before resuming removal of sample receptacles from the first or second receptacle storage areas.

Embodiment 46. The method of any one of embodiments 36-43, wherein a portion of the second receptacle storage area comprising a contiguous group of receptacle holding positions is designated as a STAT section for holding STAT sample receptacles, and wherein the method comprises first transferring all sample receptacles held in respective receptacle holding positions within the STAT section of the second receptacle storage area to the conveyer with the sample receptacle handling system before transferring sample receptacles held in remaining receptacle holding positions within the second receptacle storage area and before transferring sample receptacles held in receptacle holding positions within the first receptacle storage area.

Embodiment 47. The method of embodiment 46, further comprising, if, after all sample receptacles are removed from the STAT section of the second receptacle storage area with the sample receptacle handling system, additional sample receptacles are placed in receptacle holding positions of the STAT section while sample receptacles are being removed from remaining receptacle holding positions of the second receptacle storage area or while sample receptacles are being removed from receptacle holding positions of the first receptacle storage area, interrupting the removal of sample receptacles from the second or first receptacle storage areas and removing the additional sample receptacle placed in the STAT section before resuming removal of sample receptacles from the second or first receptacle storage areas.

Embodiment 48. The method of any one of embodiments 36-47, wherein step (1) comprises removing sample receptacles from at least a portion of each row of receptacle holding positions of the first receptacle storage area, one row at a time, starting with the row that is closest to the first side of the first receptacle storage area and then removing sample receptacles from rows progressively farther from the first side of the first receptacle storage area.

Embodiment 49. The method of any one of embodiments 36-47, wherein step (1) comprises removing all sample receptacles from at least a portion of the columns of receptacle holding positions of the first receptacle storage area, one column at a time, starting with the sample receptacle within each column that is closest to the first side of the first receptacle storage area and then removing each sample receptacle from that column that is progressively farther from the first side of the first receptacle storage area.

Embodiment 50. The method of embodiment 49, wherein the sample receptacles are removed from each column of receptacle holding positions of the first receptacle storage area, one column at a time, starting with the column that is closest to the third side of the first receptacle storage area and then removing sample receptacles from columns progressively farther from the third side of the first receptacle storage area.

Embodiment 51. The method of any one of embodiments 36-50, wherein step (2) comprises removing all sample receptacles from each row of receptacle holding positions of the second receptacle storage area, one row at a time, starting with the row that is closest to the first side of the second receptacle storage area and then removing sample receptacles from rows progressively farther from the first side of the second receptacle storage area.

Embodiment 52. The method of any one of embodiments 36-50, wherein step (2) comprises removing all sample receptacles from each column of receptacle holding positions of the second receptacle storage area, one column at a time, starting with the sample receptacle within each column that is closest to the first side of the second receptacle storage area and then removing each sample receptacle from that column that is progressively farther from the first side of the second receptacle storage area.

Embodiment 53. The method of embodiment 52, wherein the sample receptacles are removed from each column of receptacle holding positions of the second receptacle storage area, one column at a time, starting with the column that is closest to the third side of the second receptacle storage area and then removing sample receptacles from columns progressively farther from the third side of the second receptacle storage area.

Embodiment 54. The method of any one of embodiments 36-42, wherein each of the first and second receptacle storage areas comprise two or more receptacle racks removably supported on a rack supporting platform, and each receptacle rack includes a plurality of receptacle holding positions arranged in rows and columns.

Embodiment 55. The method of any one of embodiments 36-43, wherein each of the first and second receptacle storage areas comprise two or more receptacle racks removably supported on a rack supporting platform, and each receptacle rack includes a plurality of receptacle holding positions arranged in rows and columns, wherein one rack of the first receptacle storage area is designated as a STAT rack for holding STAT sample receptacles, and wherein the method comprises first transferring all sample receptacles from respective receptacle holding positions within the STAT rack with the sample receptacle handling system and before transferring sample receptacles from remaining receptacle holding positions within the first receptacle storage area and before transferring sample receptacles from receptacle holding positions within the second receptacle storage area.

Embodiment 56. The method of embodiment 55, further comprising detecting when the STAT rack has been replaced and then transferring all sample receptacles from respective receptacle holding positions within the replaced STAT rack with the sample receptacle handling system before transferring sample receptacles from remaining receptacle holding positions within the first receptacle storage area and before transferring sample receptacles from receptacle holding positions within the second receptacle storage area.

Embodiment 57. The method of any one of embodiments 54-56, wherein the racks of the first receptacle storage area are spaced apart from the racks of the second receptacle storage area by a gap forming the first receptacle transport path.

Embodiment 58. The method of any one of embodiments 54-57, wherein at least one rack of the first receptacle storage area and at least one rack of the second receptacle storage area are supported on a first drawer and at least one rack of the first receptacle storage area and at least one rack of the second receptacle storage area are supported on a second drawer.

Embodiment 59. The method of any one of embodiments 54-57, wherein the first receptacle storage area comprises four receptacle racks arranged side-by-side between the third and fourth sides of the first receptacle storage area, and wherein the four receptacle racks of the first receptacle storage area have aligned first sides corresponding to the first side of the first receptacle storage area and aligned second sides corresponding to the second side of the first receptacle storage area, and wherein the second receptacle storage area comprises four receptacle racks arranged side-by-side between the third and fourth sides of the second receptacle storage area, and wherein the four receptacle racks of the second receptacle storage area have aligned first sides corresponding to the first side of the second receptacle storage area and aligned second sides corresponding to the second side of the second receptacle storage area.

Embodiment 60. The method of embodiment 59, wherein the second receptacle transport path comprises a gap between two of the four receptacle racks of the first receptacle storage area, and wherein the gap has a width of not less than the width of the widest receptacle holding position of the second receptacle storage area.

Embodiment 61. The method of embodiment 59 or 60, wherein the rack supporting platform comprises a first drawer and a second drawer, wherein the first drawer supports two receptacle racks of the first receptacle storage area and two receptacle racks of the second receptacle storage area, and the second drawer supports two receptacle racks of the first receptacle storage area and two receptacle racks of the second receptacle storage area.

Embodiment 62. The method of any one of embodiments 36-61, wherein a portion of the first receptacle storage area comprising a contiguous group of receptacle holding positions is designated as a quarantine section configured to receive sample receptacles placed therein by the sample receptacle handling system, and wherein the method further comprises the step of transferring selected ones of the sample receptacles from receptacle holding positions of the first or second receptacle storage area that are not within the quarantine section out of the first or second receptacle storage area, as applicable, and then transferring the selected sample receptacles to receptacle holding positions of the quarantine section.

Embodiment 63. The method of embodiment 62, wherein the selected sample receptacles are transferred to the quarantine section upon the occurrence of an error with respect to the selected sample receptacle.

Embodiment 64. The method of embodiment 63, wherein the error with respect to the selected sample receptacle comprises one or more of: insufficient information is stored relating to the selected sample receptacle; no open test orders are stored for the selected sample receptacle; inability to read machine-readable information associated with the selected sample receptacle; insufficient head space within the selected sample receptacle; and insufficient sample materials contained within the selected sample receptacle.

Embodiment 65. The method of any one of embodiments 36-58, wherein a portion of the first receptacle storage area comprising a contiguous group of receptacle holding positions is designated as a quarantine section configured to receive sample receptacles placed therein by the sample receptacle handling system, wherein the second receptacle transport path comprises a column of empty receptacle holding positions of the quarantine section, and wherein the method further comprises the step of transferring selected ones of the sample receptacles from receptacle holding positions of the first or second receptacle storage area that are not within the quarantine section out of the first or second receptacle storage area, as applicable, and then transferring the selected sample receptacles to receptacle holding positions of the quarantine section other than the receptacle holding positions of the second receptacle transport path.

Embodiment 66. The method of embodiment 65, wherein the selected sample receptacles are transferred to the quarantine section upon the occurrence of an error with respect to the selected sample receptacle.

Embodiment 67. The method of embodiment 66, wherein the error with respect to the selected sample receptacle comprises one or more of: insufficient information is stored relating to the selected sample receptacle; no open test orders are stored for the selected sample receptacle; inability to read machine-readable information associated with the selected sample receptacle; insufficient head space within the selected sample receptacle; and insufficient sample materials contained within the selected sample receptacle.

Embodiment 68. The method of any one of embodiments 36 to 67, wherein each sample receptacle comprises a test tube.

Although particular embodiments have been shown and described, the above description is not intended to limit the scope of these embodiments. While embodiments and variations of the many aspects of the disclosure have been disclosed and described herein, such disclosure is provided for purposes of explanation and illustration only. Thus, various changes and modifications may be made without departing from the scope of the claims. For example, not all of the components described in the embodiments are necessary, and the disclosure may include any suitable combinations of the described components, and the general shapes and relative sizes of the components of the disclosure may be modified. Accordingly, embodiments are intended to exemplify alternatives, modifications, and equivalents that may fall within the scope of the claims. The disclosure, therefore, should not be limited, except to the following claims and their equivalents.

What is claimed is:

1. A system for storing a plurality of sample receptacles and for transferring each sample receptacle out of the system without passing over another sample receptacle stored in the system, the system comprising:

a first receptacle storage area, wherein the first receptacle storage area has opposed first and second sides and opposed third and fourth sides oriented transversely to the first and second sides and includes a plurality of receptacle holding positions, wherein each receptacle holding position is configured to hold a single sample receptacle and is spaced apart from any directly adjacent receptacle holding position by a distance that is less than the width of the narrowest receptacle holding position, wherein the plurality of receptacle holding positions are arranged in a series of parallel rows oriented in a first direction extending from the third side of the first receptacle storage area to the fourth side of the first receptacle storage area and a series of parallel columns oriented in a second direction extending from the first side of the first receptacle storage area to the second side of the first receptacle storage area; and a second receptacle storage area, wherein the second receptacle storage area has opposed first and second sides and opposed third and fourth sides oriented transversely to the first and second sides and includes a plurality of receptacle holding positions, wherein each receptacle holding position is configured to hold a single sample receptacle and is spaced apart from any directly adjacent receptacle holding position by a distance that is less than the width of the narrowest receptacle holding position, wherein the plurality of receptacle holding positions are arranged in a series of parallel rows oriented in a first direction extending from the third side of the second receptacle storage area to the fourth side of the second receptacle storage area and a series of parallel columns oriented in a second direction extending from the first side of the second receptacle storage area to the second side of the second receptacle storage area, wherein the first and second receptacle storage areas are arranged with the first side of the second receptacle storage area facing the second side of the first receptacle storage area, and wherein the second side of the first receptacle storage area is spaced apart from the first side of the second receptacle storage area by a distance of not less than the width of the widest receptacle holding position of the second receptacle storage area, thereby defining a first receptacle transport path between the first and second receptacle storage areas, and wherein the first receptacle storage area includes a second receptacle transport path extending from the first side of the first receptacle storage area to the second side of the first receptacle storage area, wherein the second receptacle transport path has a width of not less than the width of the widest receptacle holding position of the second receptacle storage area;

a conveyor configured to transport the sample receptacles;

a sample receptacle handling system configured to transfer sample receptacles held in the first and second receptacle storage areas from their respective receptacle holding positions to the conveyor; and a controller in communication with the sample receptacle handling system and programmed to:

transfer sample receptacles from the first receptacle storage area to receptacle holders supported on the conveyor by moving each sample receptacle with the sample receptacle handling system from a respective receptacle holding position of the first receptacle storage area, over the first side of the first receptacle storage area, and to the conveyor without passing over another sample receptacle held in a receptacle holding position within the first receptacle storage area; and transfer sample receptacles from the second receptacle storage area to the conveyer by:

moving each sample receptacle with the sample receptacle handling system from a respective receptacle holding position of the second receptacle storage area, over the first side of the second receptacle storage area, and into the first receptacle transport path without passing over another sample receptacle held in a receptacle holding position within the second receptacle storage area;

after the removed sample receptacle is transferred from the respective receptacle holding position of the second receptacle storage area into the first receptacle transport path, moving the sample receptacle with the sample receptacle handling system for a distance necessary to align the removed sample receptacle with the second receptacle transport path; and then moving the removed sample receptacle with the sample receptacle handling system along the second receptacle transport path from the second side of the first receptacle storage area over the first side of the first receptacle storage area and to the conveyor.

2. A method of transferring each of a plurality of sample receptacles from a receptacle storage module to a conveyor situated adjacent to the receptacle storage module, wherein the receptacle storage module includes a first receptacle storage area and a second receptacle storage area, wherein each of the first and second receptacle storage areas has opposed first and second sides and opposed third and fourth sides oriented transversely to the first and second sides, and wherein the first and second receptacle storage areas are arranged with the first side of the second receptacle storage area facing the second side of the first receptacle storage area;

wherein the first receptacle storage area includes a plurality of receptacle holding positions arranged in a series of parallel rows oriented in a first direction extending from the third side of the first receptacle storage area to the fourth side of the first receptacle storage area and a series of parallel columns oriented in a second direction extending from the first side of the first receptacle storage area to the second side of the first receptacle storage area, wherein each receptacle holding position of the first receptacle storage area is configured to hold a single sample receptacle and is spaced apart from any directly adjacent receptacle holding position by a distance that is less than the width of the narrowest receptacle holding position;

wherein the second receptacle storage area includes a plurality of receptacle holding positions arranged in a series of parallel rows oriented in a first direction extending from the third side of the second receptacle storage area to the fourth side of the second receptacle storage area and a series of parallel columns oriented in a direction extending from the first side of the second receptacle storage area to the second side of the second receptacle storage area, wherein each receptacle holding position of the second receptacle storage area is configured to hold a single sample receptacle and is spaced apart from any directly adjacent receptacle holding position by a distance that is less than the width of the narrowest receptacle holding position;

wherein the second side of the first receptacle storage area is spaced apart from the first side of the second receptacle storage area by a distance of not less than the width of the widest receptacle holding position of the second receptacle storage area, thereby defining a first receptacle transport path between the second side of the first receptacle storage area and the first side of the second receptacle storage area, wherein the first receptacle storage area includes a second receptacle transport path extending from the first side of the first receptacle storage area to the second side of the first receptacle storage area, wherein the second receptacle transport path has a width of not less than the width of the widest receptacle holding position of the second receptacle storage area, wherein the method comprises controlling a sample receptacle handling system to:

(1) transfer sample receptacles from the first receptacle storage area to the conveyor by moving each sample receptacle with the sample receptacle handling system from a respective receptacle holding position of the first receptacle storage area, over the first side of the first receptacle storage area, and to the conveyor, wherein each of the sample receptacles is removed from the first receptacle storage area in an order and via a pathway over the first side of the first receptacle storage area such that the removed sample receptacle does not pass over another sample receptacle held in a receptacle holding position within the first receptacle storage area; and (2) transfer sample receptacles from the second receptacle storage area to the conveyer by:

(a) moving each sample receptacle with the sample receptacle handling system from a respective receptacle holding position of the second receptacle storage area, over the first side of the second receptacle storage area, and into the first receptacle transport path, wherein each of the sample receptacles is removed from the second receptacle storage area in an order and via a pathway over the first side of the second receptacle storage area and into the first receptacle transport path such that the removed sample receptacle does not pass over another sample receptacle held in a receptacle holding position within the second receptacle storage area;

(b) after the removed sample receptacle is transferred from the respective receptacle holding position of the second receptacle storage area into the first receptacle transport path, moving the sample receptacle with the sample receptacle handling system for a distance necessary to align the removed sample receptacle with the second receptacle transport path; and (c) then moving the removed sample receptacle with the sample receptacle handling system along the second receptacle transport path from the second side of the first receptacle storage area over the first side of the first receptacle storage area and to the conveyor.

3. The system of claim 1, wherein the second receptacle transport path comprises a column of empty receptacle holding positions of the first receptacle storage area.

4. The system of claim 1, wherein the controller is programmed to move each sample receptacle with the sample receptacle handling system from a respective receptacle holding position of the first receptacle storage area, over the first side of the first receptacle storage area, and to the conveyor without passing over another sample receptacle held in a receptacle holding position within the first receptacle storage area by moving any sample receptacle from a respective receptacle holding position of the first receptacle storage area, other than a receptacle held in a respective receptacle holding position located in the row that is closest to the first side of the first receptacle storage area, over each of one or more intervening receptacle holding positions located between the respective receptacle holding position and the first side of the first receptacle storage area, and wherein sample receptacles will have been previously removed from the one or more intervening receptacle holding positions.

5. The system of claim 1 wherein the controller is programmed to move each sample receptacle with the sample receptacle handling system from a respective receptacle holding position of the second receptacle storage area, over the first side of the second receptacle storage area, and into the first receptacle transport path without passing over another sample receptacle held in a receptacle holding position within the second receptacle storage area by moving any sample receptacle from a respective receptacle holding position of the second receptacle storage area, other than a receptacle held in a respective receptacle holding position located in the row that is closest to the first side of the second receptacle storage area, over each of one or more intervening receptacle holding positions located between the respective receptacle holding position and the first side of the second receptacle storage area, and wherein sample receptacles will have been previously removed the one or more intervening receptacle holding positions.

6. The system of claim 1, wherein a pathway over which each sample receptacle is moved with the sample receptacle handling system from the respective receptacle holding position of the first receptacle storage area over the first side of the first receptacle storage area is programmed into the controller for each receptacle holding position of the first receptacle storage area, and a pathway over which each sample receptacle is moved with the sample receptacle handling system from the respective receptacle holding position of the second receptacle storage area over the first side of the second receptacle storage area and into the first receptacle transport path is programmed into the controller for each receptacle holding position of the second receptacle storage area.

7. The system of claim 1, wherein the sample receptacle handling system comprises:

a mechanized robot including a mechanical gripper configured to grip an individual sample receptacle within a receptacle holding position; and a gripper mover configured to effect movement of the gripper in a vertical direction and orthogonal horizontal directions.

8. The system of claim 7, wherein the controller is programmed to:

cause the sample receptacle handling system to remove sample receptacles from respective receptacle holding positions by attempting to grip a sample receptacle at the respective receptacle holding position with the mechanical gripper and to detect whether or not a sample receptacle is held at the respective receptacle holding position; and if no sample receptacle is detected at the respective receptacle holding position, to advance the mechanical gripper to a next receptacle holding position within the same row of receptacle holding positions, within the same column of receptacle holding positions, within a next row of receptacle holding positions, or within a next column of receptacle holding positions.

9. The system of claim 8, wherein each of the first and second receptacle storage areas comprise two or more receptacle racks removably supported on a rack supporting platform, and each receptacle rack includes a plurality of receptacle holding positions arranged in rows and columns, and wherein the controller is programmed to advance the mechanical gripper to a next receptacle holding position within the next rack of the first or second storage area if no sample receptacle is detected at a prescribed number of consecutive respective receptacle holding positions.

10. The system of claim 1, wherein a portion of the first receptacle storage area comprising a contiguous group of receptacle holding positions is designated as a STAT section for holding STAT sample receptacles, and wherein the controller is programmed to first transfer all sample receptacles held in respective receptacle holding positions within the STAT section of the first receptacle storage area to the conveyer with the sample receptacle handling system before transferring sample receptacles held in remaining receptacle holding positions within the first receptacle storage area and before transferring sample receptacles held in receptacle holding positions within the second receptacle storage area.

11. The system of claim 10, wherein the controller is programmed so that, if, after all sample receptacles are removed from the STAT section of the first receptacle storage area with the sample receptacle handling system, additional sample receptacles are placed in receptacle holding positions of the STAT section while sample receptacles are being removed from remaining receptacle holding positions of the first receptacle storage area with the sample receptacle handling system or while sample receptacles are being removed from receptacle holding positions of the second receptacle storage area with the sample receptacle handling system, the removal of sample receptacles from the first or second receptacle storage areas is interrupted, and the additional sample receptacles placed in the STAT section are removed with the sample receptacle handling system before resuming removal of sample receptacles from the first or second receptacle storage areas with the sample receptacle handling system.

12. The system of claim 1, wherein a portion of the second receptacle storage area comprising a contiguous group of receptacle holding positions is designated as a STAT section for holding STAT sample receptacles, and wherein the controller is programmed to first transfer all sample receptacles held in respective receptacle holding positions within the STAT section of the second receptacle storage area to the conveyer with the sample receptacle handling system before transferring sample receptacles held in remaining receptacle holding positions within the second receptacle storage area and before transferring sample receptacles held in receptacle holding positions within the first receptacle storage area.

13. The system of claim 12, wherein the controller is programmed so that, if, after all sample receptacles are removed from the STAT section of the second receptacle storage area with the sample receptacle handling system, additional sample receptacles are placed in receptacle holding positions of the STAT section while sample receptacles are being removed from remaining receptacle holding positions of the second receptacle storage area with the sample receptacle handling system or while sample receptacles are being removed from receptacle holding positions of the first receptacle storage area with the sample receptacle handling system, the removal of sample receptacles from the second or first receptacle storage areas is interrupted and the additional sample receptacles placed in the STAT section are removed with the sample receptacle handling system before resuming removal of sample receptacles from the second or first receptacle storage areas with the sample receptacle handling system.

14. The system of claim 1, wherein the controller is programmed to control the sample receptacle handling system to remove sample receptacles from at least a portion of each row of receptacle holding positions of the first receptacle storage area, one row at a time, starting with the row that is closest to the first side of the first receptacle storage area, and to then remove sample receptacles from rows progressively farther from the first side of the first receptacle storage area.

15. The system of claim 1, wherein the controller is programmed to control the sample receptacle handling system to remove all sample receptacles from at least a portion of the columns of receptacle holding positions of the first receptacle storage area, one column at a time, starting with the sample receptacle within each column that is closest to the first side of the first receptacle storage area, and to then remove each sample receptacle from that column that is progressively farther from the first side of the first receptacle storage area.

16. The system of claim 15, wherein the controller is programmed to control the sample receptacle handling system to remove the sample receptacles from at least a portion of the columns of receptacle holding positions of the first receptacle storage area, one column at a time, starting with the column that is closest to the third side of the first receptacle storage area, and to then remove sample receptacles from columns progressively farther from the third side of the first receptacle storage area.

17. The system of claim 1, wherein the controller is programmed to control the sample receptacle handling system to remove all sample receptacles from each row of receptacle holding positions of the second receptacle storage area, one row at a time, starting with the row that is closest to the first side of the second receptacle storage area, and to then remove sample receptacles from rows progressively farther from the first side of the second receptacle storage area.

18. The system of claim 1, wherein the controller is programmed to control the sample receptacle handling system to remove all sample receptacles from each column of receptacle holding positions of the second receptacle storage area, one column at a time, starting with the sample receptacle within each column that is closest to the first side of the second receptacle storage area, and to then remove each sample receptacle from that column that is progressively farther from the first side of the second receptacle storage area.

19. The system of claim 18, wherein the controller is programmed to control the sample receptacle handling system to remove the sample receptacles from each column of receptacle holding positions of the second receptacle storage area, one column at a time, starting with the column that is closest to the third side of the second receptacle storage area, and to then remove sample receptacles from columns progressively farther from the third side of the second receptacle storage area.

20. The system of claim 1, wherein each of the first and second receptacle storage areas comprises two or more receptacle racks removably supported on a rack supporting platform, and each receptacle rack includes a plurality of receptacle holding positions arranged in rows and columns.

21. The system of claim 1, wherein each of the first and second receptacle storage areas comprise two or more receptacle racks removably supported on a rack supporting platform, and each receptacle rack includes a plurality of receptacle holding positions arranged in rows and columns, wherein one rack of the first receptacle storage area is designated as a STAT rack for holding STAT sample receptacles, and wherein the controller is programmed to first transfer all sample receptacles from respective receptacle holding positions within the STAT rack to the conveyer with the sample receptacle handling system and before transferring sample receptacles from remaining receptacle holding positions within the first receptacle storage area and before transferring sample receptacles from receptacle holding positions within the second receptacle storage area.

22. The system of claim 21, wherein the controller is programmed such that, if, after all sample receptacles are removed from the STAT rack with the sample receptacle handling system, additional sample receptacles are placed in one or more receptacle holding positions of the STAT rack before all sample receptacles are removed from racks, other than the STAT rack, of the first receptacle storage area and/or the second receptacle storage area, the sample receptacle handling system is returned to the STAT rack to remove all sample receptacles held by the STAT rack before removing sample receptacles from racks, other than the STAT rack, of the first receptacle storage area and the second receptacle storage area.

23. The system of claim 21, further comprising a switch configured to generate a signal detected by the controller when the STAT rack has been replaced and wherein the controller is programmed to transfer all sample receptacles from respective receptacle holding positions within the replaced STAT rack with the sample receptacle handling system before transferring sample receptacles from remaining receptacle holding positions within the first receptacle storage area and before transferring sample receptacles from receptacle holding positions within the second receptacle storage area.

24. The system of claim 20, wherein the racks of the first receptacle storage area are separated from the racks of the second receptacle storage area by a gap forming the first receptacle transport path.

25. The system of claim 20, further comprising:

a first drawer supporting at least one rack of the first receptacle storage area and at least one rack of the second receptacle storage area; and a second drawer supporting at least one rack of the first receptacle storage area and at least one rack of the second receptacle storage.

26. The system of claim 20, wherein the first receptacle storage area comprises four receptacle racks arranged side-by-side between the third and fourth sides of the first receptacle storage area, and wherein the four receptacle racks of the first receptacle storage area have aligned first sides corresponding to the first side of the first receptacle storage area and aligned second sides corresponding to the second side of the first receptacle storage area, and wherein the second receptacle storage area comprises four receptacle racks arranged side-by-side between the third and fourth sides of the second receptacle storage area, and wherein the four receptacle racks of the second receptacle storage area have aligned first sides corresponding to the first side of the second receptacle storage area and aligned second sides corresponding to the second side of the second receptacle storage area.

27. The system of claim 26, wherein the second receptacle transport path comprises a gap between two of the four receptacle racks of the first receptacle storage area, and wherein the gap has a width of not less than the width of the widest receptacle holding position of the second receptacle storage area.

28. The system of claim 26, further comprising:

a first drawer supporting two receptacle racks of the first receptacle storage area and two receptacle racks of the second receptacle storage area; and a second drawer supporting two receptacle racks of the first receptacle storage area and two receptacle racks of the second receptacle storage area.

29. The system of claim 1, wherein a portion of the first receptacle storage area comprising a contiguous group of receptacle holding positions is designated as a quarantine section configured to receive sample receptacles placed therein by the sample receptacle handling system, and wherein the controller is programmed to transfer selected ones of the sample receptacles from receptacle holding positions of the first or second receptacle storage area that are not within the quarantine section out of the first or second receptacle storage area, as applicable, and to then transfer the selected sample receptacles to receptacle holding positions of the quarantine section.

30. The system of claim 29, wherein the controller is programmed to transfer selected sample receptacles to the quarantine section upon the occurrence of an error with respect to the selected sample receptacle.

31. The system of claim 30, wherein the error with respect to the selected sample receptacle comprises one or more of:

insufficient information is stored relating to the selected sample receptacle;

no open test orders are stored for the selected sample receptacle;

inability to read machine-readable information associated with the selected sample receptacle;

insufficient head space within the selected sample receptacle; and insufficient sample materials contained within the selected sample receptacle.

32. The system of claim 1, wherein a portion of the first receptacle storage area comprising a contiguous group of receptacle holding positions is designated as a quarantine section configured to receive sample receptacles placed therein by the sample receptacle handling system, wherein the second receptacle transport path comprises a column of empty receptacle holding positions of the quarantine section, and wherein the controller is programmed to transfer selected ones of the sample receptacles from receptacle holding positions of the first or second receptacle storage area that are not within the quarantine section out of the first or second receptacle storage area, as applicable, and to then transfer the selected sample receptacles to receptacle holding positions of the quarantine section other than the receptacle holding positions of the second receptacle transport path.

33. The system of claim 32, wherein the controller is programmed to transfer selected sample receptacles to the quarantine section upon the occurrence of an error with respect to the selected sample receptacle.

34. The system of claim 33, wherein the error with respect to the selected sample receptacle comprises one or more of:

insufficient information is stored relating to the selected sample receptacle;

no open test orders are stored for the selected sample receptacle;

inability to read machine-readable information associated with the selected sample receptacle;

insufficient head space within the selected sample receptacle; and insufficient sample materials contained within the selected sample receptacle.

35. The system of claim 1, wherein each sample receptacle comprises a test tube.

36. The system of claim 1, further comprising a plurality of receptacle holders, each receptacle holder being supported on the conveyor and configured to receive a sample receptacle and hold the sample receptacle in an upright orientation.

* * * * *